(12) United States Patent
Ise et al.

(10) Patent No.: US 12,506,952 B2
(45) Date of Patent: Dec. 23, 2025

(54) ELECTRONIC DEVICE, CONTROL METHOD FOR CONTROLLING THE SAME, AND RECORDING MEDIUM

(71) Applicant: CANON KABUSHIKI KAISHA, Tokyo (JP)

(72) Inventors: Toshimichi Ise, Kanagawa (JP); Satsuki Tomizawa, Kanagawa (JP); Kouki Yamashita, Tokyo (JP); Tadayoshi Ono, Kanagawa (JP); Tatsuhide Matsuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/701,444

(22) Filed: Mar. 22, 2022

(65) Prior Publication Data
US 2022/0311949 A1   Sep. 29, 2022

(30) Foreign Application Priority Data

Mar. 26, 2021   (JP) .................................. 2021-053820
Mar. 26, 2021   (JP) .................................. 2021-053821

(51) Int. Cl.
*H04N 23/63* (2023.01)

(52) U.S. Cl.
CPC .................................. *H04N 23/634* (2023.01)

(58) Field of Classification Search
CPC .... H04N 23/634; H04N 23/633; H04N 23/60; G03B 17/55; G05D 23/20
See application file for complete search history.

(56) References Cited

U.S. PATENT DOCUMENTS

| | | | |
|---|---|---|---|
| 2009/0009617 A1 | 1/2009 | Ito et al. | |
| 2012/0189264 A1* | 7/2012 | Okazaki | H04N 23/633 |
| | | | 386/E5.069 |
| 2014/0055623 A1 | 2/2014 | Okada | |
| 2019/0037145 A1* | 1/2019 | Omori | H04N 1/0048 |

FOREIGN PATENT DOCUMENTS

| | | |
|---|---|---|
| CN | 101252643 A | 8/2008 |
| CN | 103634522 A | 3/2014 |
| JP | 2008011233 A | 1/2008 |
| JP | 2008186387 A | 8/2008 |

(Continued)

OTHER PUBLICATIONS

Sun Wan-Lin et al., Design and Simulation of Multi-Point Temperature Detection System About Greenhouse, China Academic Journal Electronic Publishing House, Sep. 2020, 258-266p.

*Primary Examiner* — Joseph W Becker
(74) *Attorney, Agent, or Firm* — Canon U.S.A., Inc. IP Division

(57) ABSTRACT

A user can more easily recognize a change in the internal state of a device and a change in the temperature of the device due to the change in the internal state. An electronic device includes a display unit, and a control unit configured to display a temperature change acquired from a temperature acquisition unit configured to acquire a temperature of the electronic device and a state change acquired from a detection unit configured to detect a state of the electronic device, wherein the control unit performs control to display on the display unit the temperature change and the state change for a single time at a certain time point.

15 Claims, 20 Drawing Sheets

(56) References Cited

FOREIGN PATENT DOCUMENTS

| | | | |
|---|---|---|---|
| JP | 2008211367 | A | 9/2008 |
| JP | 2008311915 | A | 12/2008 |
| JP | 2009200815 | A | 9/2009 |
| JP | 2010070301 | A | 4/2010 |
| JP | 2012165372 | A | 8/2012 |
| JP | 2014015116 | A | 1/2014 |
| JP | 2014042168 | A | 3/2014 |
| JP | 2014042172 | A | 3/2014 |
| JP | 2014110506 | A | 6/2014 |
| JP | 2017005323 | A | 1/2017 |
| JP | 2019186806 | A | 10/2019 |
| JP | 2019209374 | A | 12/2019 |
| WO | 2020245914 | A1 | 12/2020 |

* cited by examiner

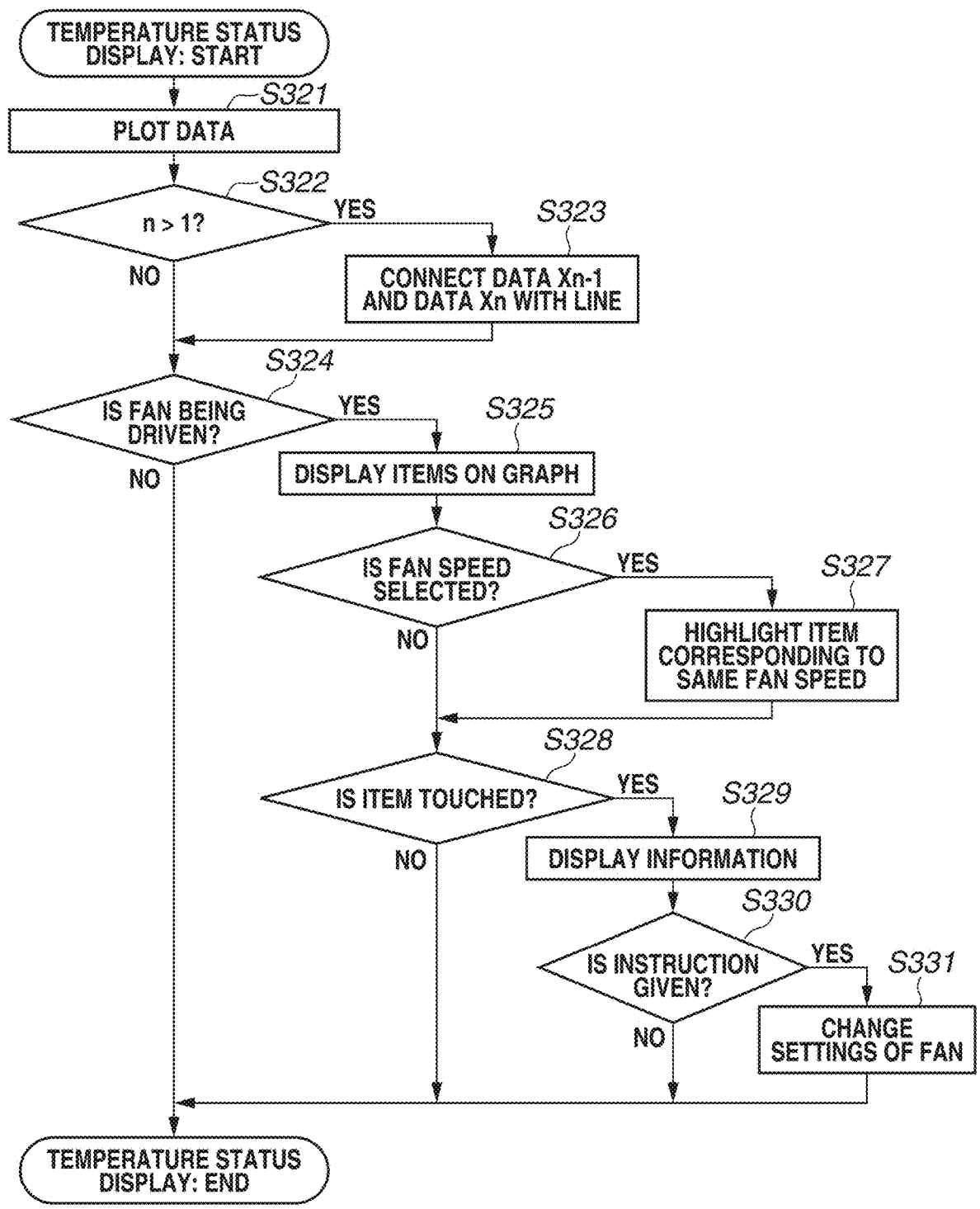

|  | TEMPERATURE | FAN | CLOCK TIME |
|---|---|---|---|
| $X_1$ | 40 | LOW | 10:00 |
| $X_2$ | 41 | LOW | 10:10 |
| $X_3$ | 43 | LOW | 10:20 |
| $X_4$ | 45 | LOW | 10:30 |
| $X_5$ | 47 | MIDDLE | 10:40 |
| $X_6$ | 55 | MIDDLE | 10:50 |
| $X_7$ | 61 | MIDDLE | 11:00 |
| $X_8$ | 64 | MIDDLE | 11:10 |
| $X_9$ | 66 | MIDDLE | 11:20 |
| $X_{10}$ | 65 | HIGH | 11:30 |
| $X_{11}$ | 62 | HIGH | 11:40 |

FIG.9A

| LOCATION IN CAMERA | TEMPERATURE STATE 1 | TEMPERATURE STATE 2 | TEMPERATURE STATE 3 |
|---|---|---|---|
| LENS SURFACE | TEMPERATURE SENSOR 93a ≤ 60 OR TEMPERATURE SENSOR 93b ≤ 70 | 60 < TEMPERATURE SENSOR 93a ≤ 70 AND 70 < TEMPERATURE SENSOR 93b ≤ 80 | TEMPERATURE SENSOR 93a > 70 AND TEMPERATURE SENSOR 93b > 80 |
| GRIP | TEMPERATURE SENSOR 93a ≤ 60 OR TEMPERATURE SENSOR 93b ≤ 70 | 50 < TEMPERATURE SENSOR 93a ≤ 60 AND 55 < TEMPERATURE SENSOR 93b ≤ 65 | TEMPERATURE SENSOR 93a > 60 AND TEMPERATURE SENSOR 93b > 65 |
| LCD | TEMPERATURE SENSOR 93c ≤ 50 | 50 < TEMPERATURE SENSOR 93c ≤ 60 | TEMPERATURE SENSOR 93c > 60 |
| MEDIUM | TEMPERATURE SENSOR 93d ≤ 50 | 50 < TEMPERATURE SENSOR 93d ≤ 60 | TEMPERATURE SENSOR 93d > 60 |
| BATTERY | TEMPERATURE SENSOR 93d ≤ 50 | 50 < TEMPERATURE SENSOR 93d ≤ 60 | TEMPERATURE SENSOR 93d > 60 |

FIG.9B

| LOCATION IN CAMERA | COOLING METHOD IN TEMPERATURE STATE 2 | COOLING METHOD IN TEMPERATURE STATE 3 |
|---|---|---|
| LENS SURFACE | PLEASE APPLY COOLANT BY COVERING CONNECTION PORTION OF LENS | PLEASE APPLY COOLANT BY COVERING CONNECTION PORTION OF LENS WHILE APPLYING COOL AIR TO AIR INTAKE PORT OF FAN |
| GRIP | PLEASE APPLY COOL AIR WITHOUT TOUCHING GRIP | PLEASE APPLY COOLANT TO GRIP |
| LCD | PLEASE APPLY COOLANT TO CENTER OF LCD | PLEASE APPLY COOLANT TO CENTER OF LCD WHILE APPLYING COOL AIR TO AIR INTAKE PORT OF FAN |
| MEDIUM | PLEASE APPLY COOLANT WITHOUT BLOCKING FAN | PLEASE APPLY COOLANT WITHOUT BLOCKING FAN WHILE APPLYING COOL AIR TO AIR INTAKE PORT OF FAN |
| BATTERY | REPLACE BATTERY WITH LOW-TEMPERATURE BATTERY | PLEASE REPLACE BATTERY WITH LOW-TEMPERATURE BATTERY AND APPLY COOLANT WITHOUT BLOCKING AIR EXHAUST PORT OF FAN |

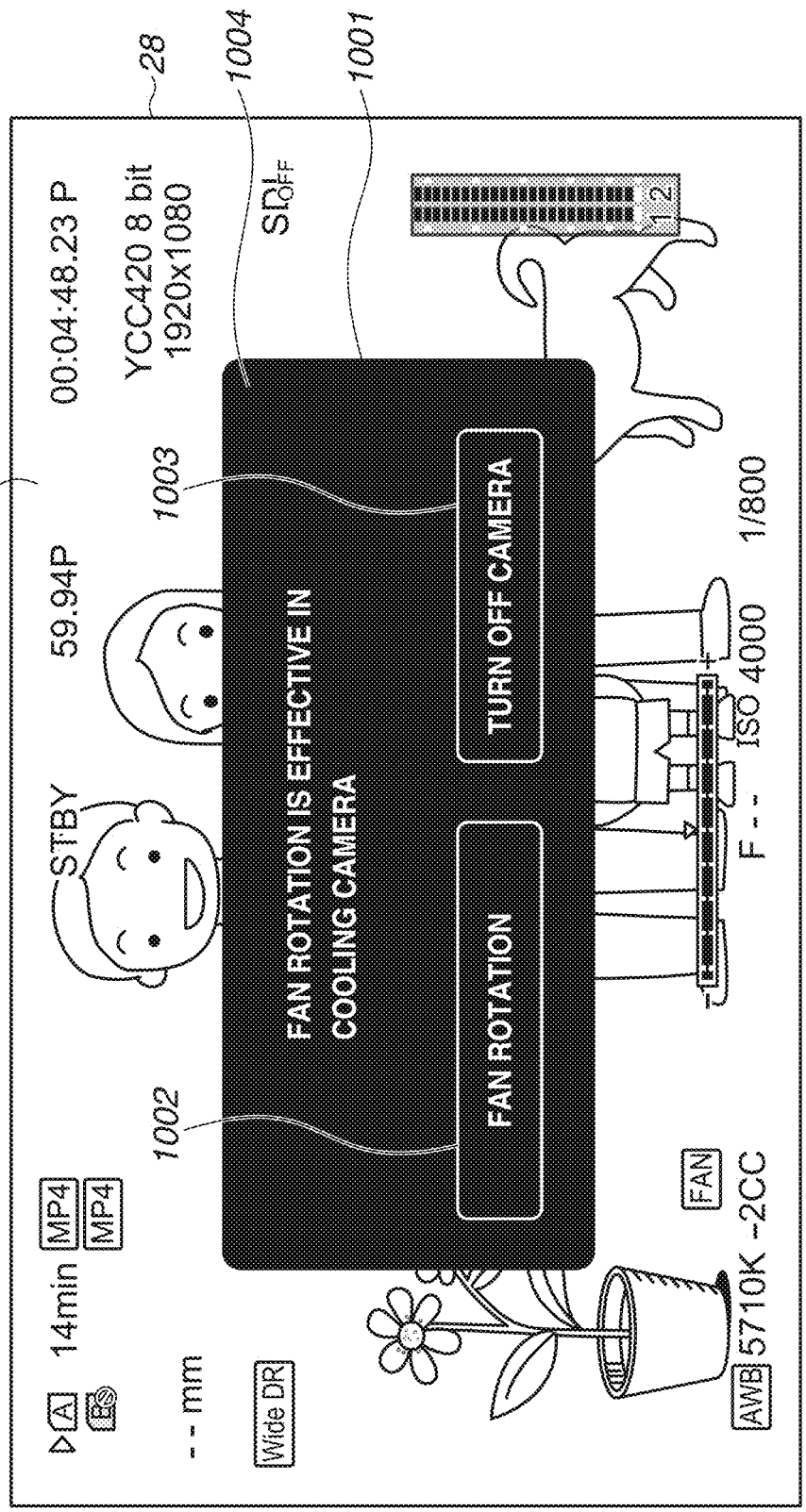

| DATA ID | TEMPERATURE | DATE AND TIME | LATEST DATA? |
|---|---|---|---|
| 55 | 60 | 2021/10/04 15:15:20 | TRUE |
| 54 | 62 | 2021/10/04 15:14:19 | FALSE |
| 53 | 63 | 2021/10/04 15:13:19 | FALSE |
| 52 | 61 | 2021/10/04 15:12:18 | FALSE |
| 51 | 58 | 2021/10/04 15:11:15 | FALSE |
| 50 | 55 | 2021/10/04 15:10:10 | FALSE |
| 49 | 58 | 2021/10/04 15:07:00 | FALSE |
| 48 | 57 | 2021/10/04 15:05:58 | FALSE |
| 47 | 55 | 2021/10/04 15:04:54 | FALSE |
| ... | ... | ... | ... |

| DATA ID 1331 | TEMPERATURE 1332 | DATE AND TIME 1333 | LATEST DATA? 1334 |
|---|---|---|---|
| 55 | 40 | 2021/10/04 15:15:20 | TRUE |
| 54 | 42 | 2021/10/04 15:14:19 | FALSE |
| 53 | 43 | 2021/10/04 15:13:19 | FALSE |
| 52 | 41 | 2021/10/04 15:12:18 | FALSE |
| 51 | 38 | 2021/10/04 15:11:15 | FALSE |
| 50 | 35 | 2021/10/04 15:10:10 | FALSE |
| 49 | 58 | 2021/10/04 14:40:10 | FALSE |
| 48 | 57 | 2021/10/04 14:49:05 | FALSE |
| 47 | 55 | 2021/10/04 14:48:04 | FALSE |
| ... | ... | ... | ... |

ELECTRONIC DEVICE, CONTROL METHOD FOR CONTROLLING THE SAME, AND RECORDING MEDIUM

BACKGROUND

Field of the Disclosure

The present disclosure relates to the acquisition of the temperature of an electronic device and a control method for controlling an electronic device.

Description of the Related Art

In recent years, many imaging apparatuses capable of recording a moving image are known. When an imaging apparatus records a moving image, heat is generated inside the imaging apparatus. Thus, to reduce the influence on a user and protect the apparatus and the image quality, a countermeasure against the generated heat is an important issue. Particularly, due to an improvement in the image quality of an image that can be captured in recent years, a rise in the temperature inside an apparatus in a live view image capturing standby state greatly influences a decrease in recording time due to a rise in the temperature when the apparatus records a moving image. The publication of Japanese Patent Application Laid-Open No. 2008-311915 discusses a technique in which the operation of an electronic device is restricted based on a measured temperature, and if the operation is restricted, an operation restoration status, such as time indicating in how many more minutes the electronic device will be restored, is displayed so that a user can visually confirm how much time will elapse before the restriction of the operation is lifted. The publication of Japanese Patent Application Laid-Open No. 2014-110506 discusses a technique in which based on a measured temperature, a specific time indicates how long the operation of an electronic device needs to be turned off to cause the electronic device to continuously operate for a predetermined time or more from the current time.

However, in the publication of Japanese Patent Application Laid-Open No. 2008-311915 or the publication of Japanese Patent Application Laid-Open No. 2014-110506, the time taken to lift the restriction or the time when the electronic device can be used is calculated using an environment or a setting parameter at that time. Thus, if the environment or the parameter changes, the time needs to be calculated again. A user cannot easily recognize to what extent a change in an internal state such as a setting parameter influences the time taken to lift the restriction, the time when the electronic device can be used, or a change in temperature.

SUMMARY

According to an aspect of the present disclosure, an electronic device includes a display unit, and a control unit configured to display a temperature change acquired from a temperature acquisition unit configured to acquire a temperature of the electronic device and a state change acquired from a detection unit configured to detect a state of the electronic device, wherein the control unit performs control to display on the display unit the temperature change and the state change for a single time at a certain time point.

Further features of the present disclosure will become apparent from the following description of exemplary embodiments with reference to the attached drawings.

BRIEF DESCRIPTION OF THE DRAWINGS

FIGS. 3A to 3C are control process flowcharts regarding a temperature of the digital camera.

FIGS. 9A to 9C are diagrams illustrating placement positions of temperature sensors of the digital camera and temperature states according to the placement positions.

FIG. 10 illustrates a display example of options regarding a cooling method.

DESCRIPTION OF THE EMBODIMENTS

With reference to the drawings, suitable exemplary embodiments of the present disclosure will be described below.

Figure 1A:
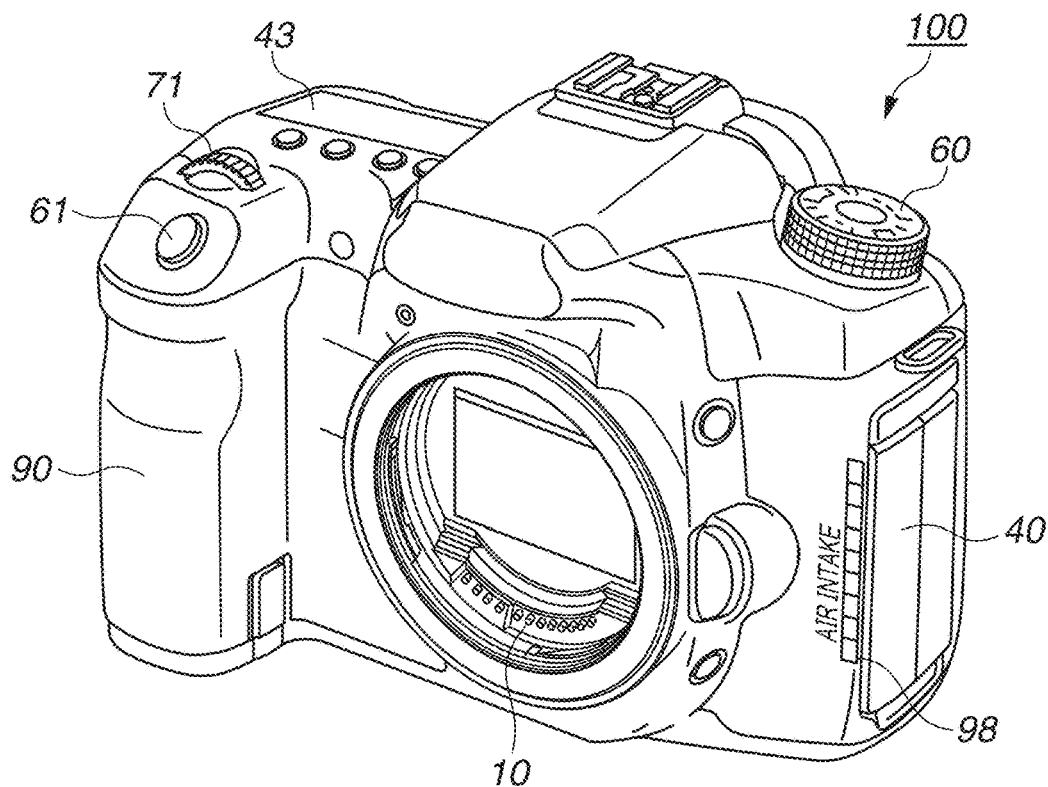
FIGS. 1A and 1B are external views of a digital camera.
Figure 1B:
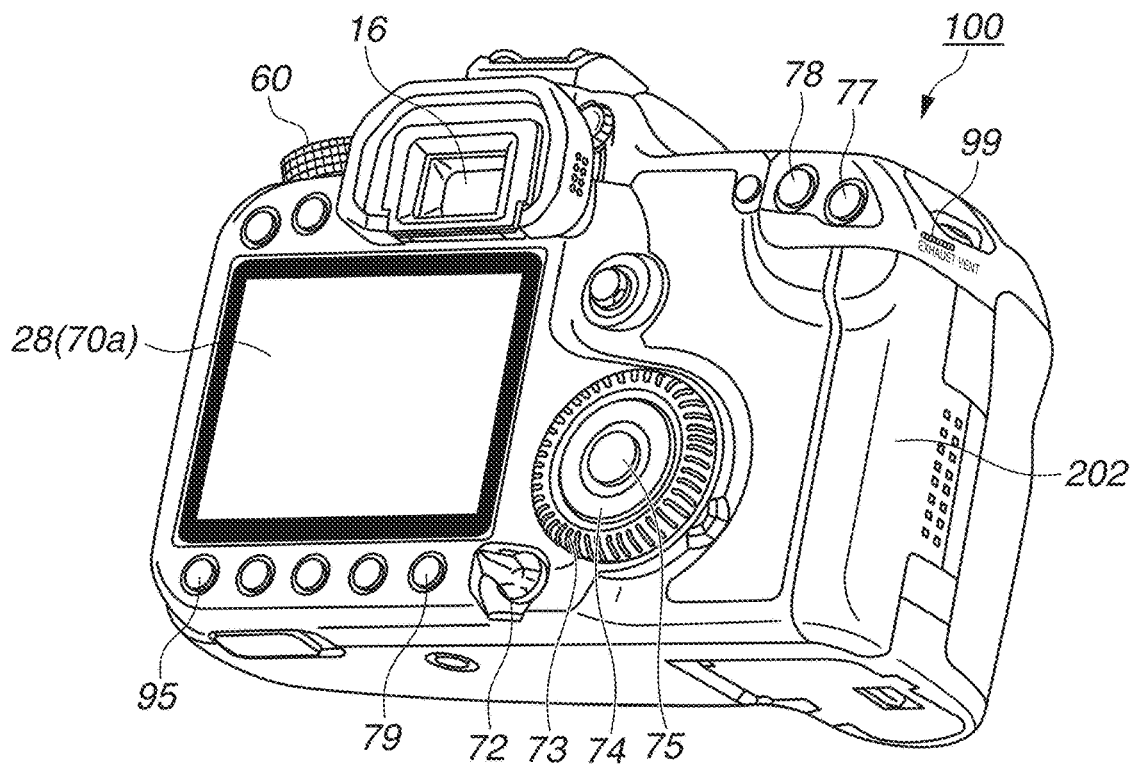

FIGS. 1A and 1B illustrate external views of a digital camera 100 as an example of an apparatus to which the present disclosure is applicable. FIG. 1A is a front perspective view of the digital camera 100. FIG. 1B is a rear perspective view of the digital camera 100. In FIGS. 1A and 1B, a display unit 28 is a display unit that is provided on the back surface of the camera 100 and displays an image and various pieces of information. A touch panel 70a is an operation member on which a touch operation can be performed. The touch panel 70a can detect a touch operation on a display surface (an operation surface) of the display unit 28. An outside-viewfinder display unit 43 is a display unit that is provided on the upper surface of the camera 100 and displays various setting values of the camera 100, such as the setting values of the shutter speed and the stop.

A shutter button 61 is an operation unit for giving an image capturing instruction. In a still image capturing mode, the shutter button 61 is used to give a still image capturing preparation instruction or a still image capturing instruction. In a moving image capturing mode, the shutter button 61 is used to give an instruction to start or stop the capturing (recording) of a moving image. A mode selection switch 60 is an operation unit for switching various modes. A terminal cover 40 is a cover that protects a connector (not illustrated) for connecting a connection cable for an external device and the digital camera 100. A main electronic dial 71 is a rotary operation member included in an operation unit 70. The main electronic dial 71 is rotated, whereby the setting value of the shutter speed or the stop can be changed. A power switch 72 is an operation member for switching the turning on and off of the digital camera 100. A sub electronic dial 73 is a rotary operation member included in the operation unit 70 and enables the movement of a selection frame or image advancement. A directional pad 74 is an operation member included in the operation unit 70 and including a push button that can be pushed in in four directions. The directional pad 74 enables an operation according to the direction in which the directional pad 74 is pressed. A SET button 75 is a push button included in the operation unit 70 and is mainly used to determine a selected item. A moving image button 77 is used to give an instruction to start or stop the capturing (recording) of a moving image. If the shutter button 61 is pressed after an automatic exposure (AE) lock button 78 is pressed, an image can be captured by fixing an autofocus (AF) position, or an image can be captured even in the situation where AF cannot be performed. A reproduction button 79 is an operation button included in the operation unit 70 and used to switch an image capturing mode and a reproduction mode. The reproduction button 79 is pressed in the image capturing mode, whereby the image capturing mode transitions to the reproduction mode, and the most recent image among images recorded in a recording medium 200 can be displayed on the display unit 28. An assign button 95 is a button that is included in the operation unit 70 and can be assigned another function. In an initial state, the assign button 95 functions as a button used to display a status screen. The assign button 95 can be assigned, as another function, the function of changing a setting content or a state regarding the capturing and the reproduction of a moving image, or the function of starting the capturing (recording) of a moving image. Alternatively, another assign button other than the assign button 95 can also be assigned the function of displaying the status screen.

The status screen is a screen including a plurality of pages that displays a setting content or a state regarding the capturing and the reproduction of a moving image and the internal state of the digital camera 100.

A communication terminal 10 is a communication terminal for the digital camera 100 to communicate with a lens unit 150 (attachable to and detachable from the digital camera 100). An eyepiece portion 16 is an eyepiece portion of an eyepiece viewfinder (a look-in type viewfinder). A user can visually confirm a video displayed on an electronic viewfinder (EVF) 29, which is an inside-viewfinder display unit, through the eyepiece portion 16. A cover 202 is a cover of a slot in which the recording medium 200 and a battery are stored. A grip portion 90 is a holding portion having a shape that makes it easy for the user to grip the holding portion with the right hand when the user holds up the digital camera 100. The shutter button 61 and the main electronic dial 71 are placed at the positions where the user can operate the shutter button 61 and the main electronic dial 71 with the right index finger in the state where the user holds the digital camera 100 by gripping the grip portion 90 with the right little, ring, and middle fingers. The sub electronic dial 73 is placed at the position where the user can operate the sub electronic dial 73 with the right thumb in the same state.

An air intake port 98 and an air exhaust port 99 are the passages of air for cooling a main body of the digital camera 100. If a fan 92 in FIG. 2 rotates, air flows from the air intake port 98 to the air exhaust port 99 and thereby can release the heat of the main body. The main body includes one or more temperature sensors 93. A temperature sensor 93 can measure the temperature of a particular portion of the main body. According to the measured temperature, the fan 92 is stopped, or the number of revolutions of the fan 92 is changed. Although described below, based on the exterior and internal temperatures of the main body acquired from the temperature sensor 93, temperature state information is displayed on a screen. A plurality of temperature sensors 93 or a plurality of fans 92 may exist. Also, each temperature sensor 93 of a plurality of temperature sensors 93 may be distinguished by an alphabetic suffix (e.g., 93*a*, 93*b*).

Figure 2:
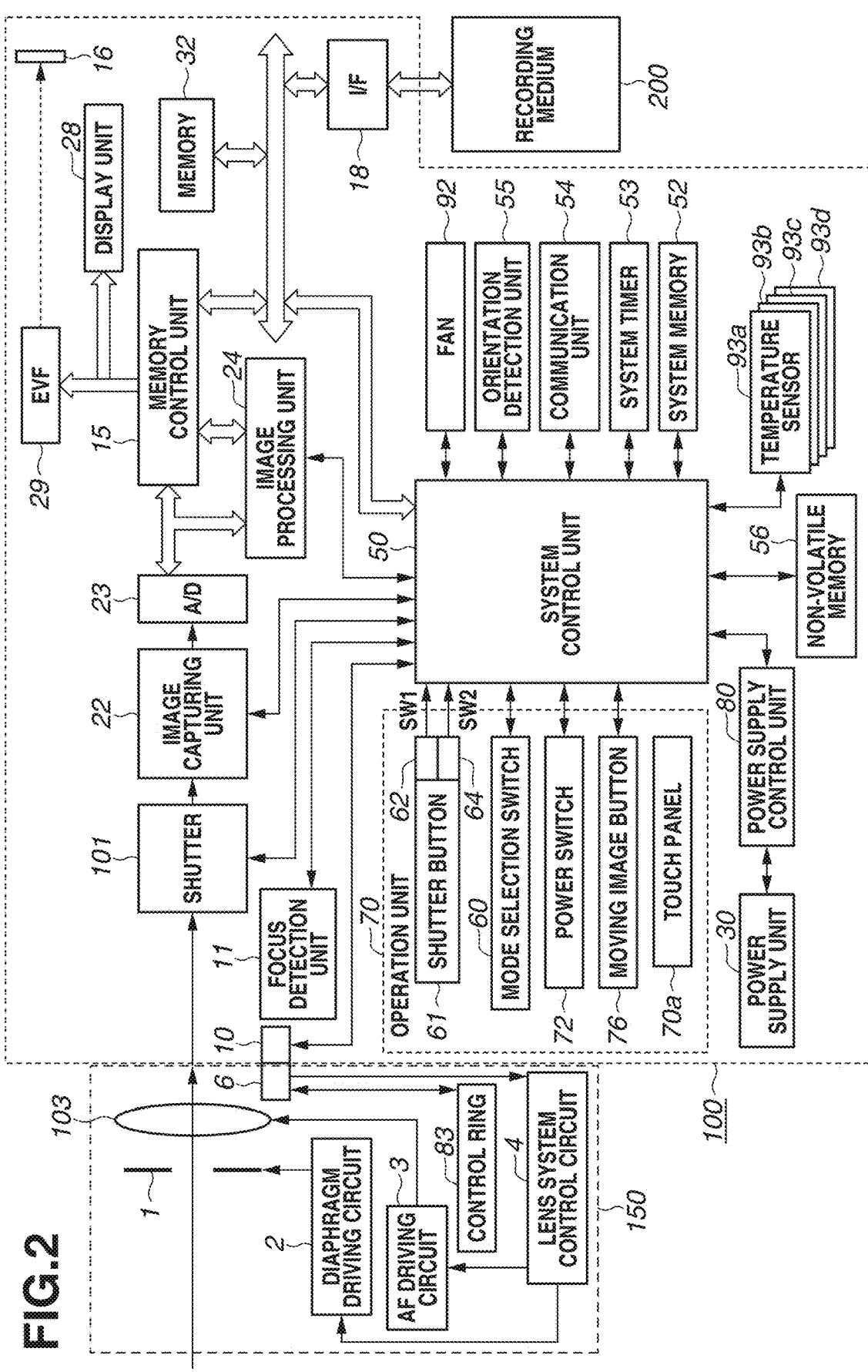
FIG. 2 is a block diagram illustrating a configuration of the digital camera.

FIG. 2 is a block diagram illustrating an example of the configuration of the digital camera 100 according to the present exemplary embodiment. In FIG. 2, the lens unit 150 is a lens unit on which an interchangeable imaging lens is mounted. Although a lens 103 normally includes a plurality of lenses, FIG. 2 illustrates only a single lens in a simplified manner. A communication terminal 6 is a communication terminal for the lens unit 150 to communicate with the digital camera 100. The lens unit 150 communicates with a system control unit 50 via the communication terminals 6 and 10 and causes a lens system control circuit 4 within the lens unit 150 to control a diaphragm 1 via a diaphragm driving circuit 2. Then, the lens unit 150 displaces the lens 103 via an AF driving circuit 3, thereby bringing the lens 103 into focus.

A shutter 101 is a focal-plane shutter capable of freely controlling the exposure time of an image capturing unit 22 by control of the system control unit 50.

The image capturing unit 22 is an image sensor composed of a charge-coupled device (CCD) or a complementary metal-oxide-semiconductor (CMOS) device, which converts an optical image into an electric signal. An analog-to-digital (A/D) converter 23 is used to convert an analog signal output from the image capturing unit 22 into a digital signal.

An image processing unit 24 performs predetermined processes, such as a resizing process (such as pixel interpolation and reduction) and a color conversion process, on data from the A/D converter 23 or data from a memory control unit 15.

The image processing unit 24 performs a predetermined calculation process using captured image data. The system control unit 50 performs exposure control and distance measurement control based on the calculation result obtained by the image processing unit 24. Consequently, an AF process, an AE process, and a pre-flash (EF) process are performed by a through-the-lens (TTL) method. Further, the image processing unit 24 performs a predetermined calculation process using captured image data and performs an auto white balance (AWB) process by the TTL method based on the obtained calculation result.

The memory control unit 15 controls the transmission and reception of data between the A/D converter 23, the image processing unit 24, and a memory 32. Output data from the A/D converter 23 is written directly to the memory 32 via the image processing unit 24 and the memory control unit 15 or via the memory control unit 15. The memory 32 stores image data obtained by the image capturing unit 22 and converted into digital data by the A/D converter 23 and image data to be displayed on the display unit 28 or the EVF 29. The memory 32 includes a sufficient storage capacity for storing a predetermined number of still images and a moving image and a sound of a predetermined length of time.

The memory 32 doubles as a memory for image display (a video memory). Image data for display written in the memory 32 is displayed on the display unit 28 or the EVF 29 via the memory control unit 15. The display unit 28 or the EVF 29 performs display on a display device, such as a liquid crystal display (LCD) or an organic electroluminescent (EL) display, according to a signal from the memory control unit 15. Data is converted from analog data to digital data by the A/D converter 23, and the digital data is accumulated in the memory 32 and sequentially transferred to and displayed on the display unit 28 or the EVF 29, whereby the display unit 28 or the EVF 29 can perform live view display (LV display). Hereinafter, an image displayed in live view will be referred to as a "live view image (LV image)".

A compression unit (the image processing unit 24) compresses temporally consecutive image data stored in the memory 32 into a Moving Picture Experts Group (MPEG) format data, thereby generating moving image data. The generated moving image data is stored in the memory 32 via the memory control unit 15 and then multiplexed with a sound similarly stored in the memory 32. Then, the resulting data is written as a moving image file to the recording medium 200.

The outside-viewfinder display unit 43 displays various setting values of the camera 100, such as the setting values of the shutter speed and the stop, via an outside-viewfinder display unit driving circuit (the system control unit 50).

A non-volatile memory 56 is an electrically erasable and recordable memory. As the non-volatile memory 56, for example, an Electrically Erasable Programmable Read-Only Memory (EEPROM) is used. The non-volatile memory 56 stores a constant for the operation of the system control unit 50 and a program. The "program" as used herein refers to a program for executing various flow charts described below in the present exemplary embodiment.

The system control unit 50 is a control unit composed of at least one processor and/or at least one circuit and controls the entirety of the digital camera 100. The system control unit 50 executes the above program recorded in the non-volatile memory 56, thereby achieving processes described below in the present exemplary embodiment. As a system memory 52, for example, a random-access memory (RAM) is used. A constant and a variable for the operation of the system control unit 50 and the program read from the non-volatile memory 56 are loaded into the system memory 52. The system control unit 50 also controls the memory 32, and the display unit 28, thereby performing display control.

A system timer 53 is a time measurement unit that measures the time used for various types of control and the time of a built-in clock.

The operation unit 70, including the mode selection switch 60, a first shutter switch 62, and a second shutter switch 64, is an operation unit for inputting various operation instructions to the system control unit 50.

The mode selection switch 60 is used to switch the operation mode of the system control unit 50 to any one of a still image recording mode, a moving image capturing mode, and a reproduction mode. The still image recording mode includes an auto image capturing mode, an auto scene distinction mode, a manual mode, a stop priority mode (an Av mode), a shutter speed priority mode (a Tv mode), and a program AE mode. The still image recording mode also includes various scene modes in which image capturing settings are made according to image capturing scenes, and a custom mode. Using the mode selection switch 60, the user can directly switch to any one of these modes. Alternatively, using the mode selection switch 60, the user may once switch to a list screen of image capturing modes, then select any one of a plurality of modes displayed on the list screen, and switch to the selected mode using another operation member. Similarly, the moving image capturing mode may also include a plurality of modes.

The first shutter switch 62 is turned on in an intermediate state of an operation, i.e., by a so-called half press (an image capturing preparation instruction), on the shutter button 61 provided in the digital camera 100 and generates a first shutter switch signal SW1. Based on the first shutter switch signal SW1, the system control unit 50 starts an operation such as an AF process, an AE process, an AWB process, or an EF process.

The second shutter switch 64 is turned on by the completion of an operation, i.e., by a so-called full press (an image capturing instruction), on the shutter button 61 and generates a second shutter switch signal SW2. Based on the second shutter switch signal SW2, the system control unit 50 starts a series of operations of an image capturing process from the reading of a signal from the image capturing unit 22 to the writing of image data to the recording medium 200.

The operation members of the operation unit 70 are appropriately assigned functions for corresponding scenes by performing the operation of selecting various function icons displayed on the display unit 28 and act as various function buttons. The function buttons include, for example, an end button, a return button, an advance-image button, a jump button, a narrow-down button, and a change-attributes button. For example, if a menu button is pressed, a menu screen where various settings can be made is displayed on the display unit 28. The user can intuitively make various settings using the menu screen displayed on the display unit 28, a four-directional button for up, down, left, and right directions, and the SET button 75.

The operation unit 70 includes various operation members and is an input unit that receives operations from the user.

The operation unit 70 includes a push button, a rotating dial, and a touch sensor and includes at least operation members such as the shutter button 61, the main electronic dial 71, the power switch 72, the sub electronic dial 73, the directional pad 74, the SET button 75, the moving image button 77, the AE lock button 78, the reproduction button 79, and the assign button 95.

A power supply control unit 80 includes a battery detection circuit, a direct-current-to-direct-current (DC/DC) converter, and a switch circuit for switching blocks to which to apply a current. The power supply control unit 80 detects the presence or absence of the attachment of a battery, the type of the battery, and the remaining amount of the battery. The power supply control unit 80 controls the DC/DC converter based on the detection results and an instruction from the system control unit 50 and supplies a required voltage to the components including the recording medium 200 for a required period. A power supply unit 30 includes a primary battery, such as an alkaline battery or a lithium battery; a secondary battery, such as a nickel-cadmium (NiCd) battery, a nickel-metal hydride (NiMH) battery, or a lithium-ion (Li) battery; or an alternating current (AC) adapter.

A recording medium interface (I/F) 18 is an interface with the recording medium 200, such as a memory card or a hard disk. The recording medium 200 is a recording medium, such as a memory card, for recording a captured image and moving image data and is composed of a semiconductor memory or a magnetic disk.

A communication unit 54 connects to an external device wirelessly or via a cable for a wired connection, and transmits and receives a video signal and a sound signal to and from the external device. The communication unit 54 can also connect to a wireless local area network (LAN) or the Internet. The communication unit 54 can communicate with the external device also using Bluetooth® or Bluetooth Low Energy. The communication unit 54 can transmit an image (including an LV image) captured by the image capturing unit 22 or an image stored in the storage medium 200 to the external device and also receive an image or various other pieces of information from the external device.

An orientation detection unit 55 detects the orientation of the digital camera 100 relative to the direction of gravity. Based on the orientation detected by the orientation detection unit 55, the system control unit 50 can determine whether an image captured by the image capturing unit 22 is an image captured with the digital camera 100 held up horizontally or an image captured with the camera 100 held up vertically. The system control unit 50 can add direction information according to the orientation detected by the orientation detection unit 55 to an image file of an image captured by the image capturing unit 22 or store the image by rotating the image based on the orientation detected by the orientation detection unit 55. As the orientation detection unit 55, an acceleration sensor or a gyro sensor can be used. Using the acceleration sensor or the gyro sensor as the orientation detection unit 55, the system control unit 50 can also detect the motion of the digital camera 100 (whether the digital camera 100 is panned, tilted, lifted, or at rest).

The operation unit 70 includes, as one of the operation members, the touch panel 70a, which can detect contact with the display unit 28. The touch panel 70a and the display unit 28 can be integrally formed. For example, the touch panel 70a is configured so that the transmittance of light of the touch panel 70a does not hinder the display of the display unit 28. Then, the touch panel 70a is attached to an upper layer of the display surface of the display unit 28. Then, input coordinates on the touch panel 70a are associated with display coordinates on the display screen of the display unit 28. Consequently, it is possible to provide a graphical user interface (GUI) as if the user can directly operate a screen displayed on the display unit 28. The system control unit 50 can detect at least the following operations on the touch panel 70a or the following states.

- The state where a finger or a pen that has not touched the touch panel 70a newly touches the touch panel 70a, i.e., the start of a touch (hereinafter referred to as a "touch-down").
- The state where the finger or the pen touches the touch panel 70a (hereinafter referred to as a "touch-on").
- The state of moving the finger or the pen while the finger or the pen keeps touching the touch panel 70a (hereinafter referred to as a "touch move").
- The state of separating from the touch panel 70a the finger or the pen having touched the touch panel 70a, i.e., the end of a touch (hereinafter referred to as a "touch-up").
- The state where nothing touches the touch panel 70a (hereinafter referred to as a "touch-off").

If a touch-down is detected, simultaneously, a touch-on is also detected. After the touch-down, normally, the touch-on continues to be detected unless a touch-up is detected. A touch move is detected also in the state where the touch-on is detected. Even if the touch-on is detected, but if the touch position does not move, a touch move is not detected. After a touch-up of all the fingers or the pen having touched the touch panel 70a is detected, a touch-off is detected.

The system control unit 50 is notified via an internal bus of these operations and states and the position coordinates where the finger or the pen touches the touch panel 70a. Based on the information of which the system control unit 50 is notified, the system control unit 50 determines what touch operation is performed on the touch panel 70a.

In the case of a touch move, the system control unit 50 can also determine, based on changes in the position coordinates, the moving direction of the finger or the pen moving on the touch panel 70a with respect to each of the vertical and horizontal components on the touch panel 70a. If a touch move performed by a predetermined distance or more is detected, the system control unit 50 determines that a slide operation is performed. The operation of quickly moving the finger by some distance while the finger keeps touching the touch panel 70a, and then separating the finger from the touch panel 70a immediately after the quick movement is referred to as a "flick". In other words, the flick is the operation of quickly tracing the touch panel 70a with the finger in a flipping manner. If a touch move performed by a predetermined distance or more at a predetermined speed or more is detected, and a touch-up is detected immediately after the touch move, the system control unit 50 can determine that a flick is performed (can determine that a flick is performed following a slide operation).

Further, a touch operation for simultaneously touching a plurality of places (e.g., two points) and bringing the touch positions close to each other is referred to as a "pinch-in", and a touch operation for separating the touch positions from each other is referred to as a "pinch-out".

The pinch-out and the pinch-in are collectively referred to as a "pinch operation" (or simply as a "pinch").

The touch panel 70a may be a touch panel of any of various types, such as a resistive type, a capacitive type, a surface acoustic wave type, an infrared type, an electromagnetic induction type, an image recognition type, and a photosensor type. Although a method for detecting the presence of a touch according to the presence of the contact of the finger or the pen with the touch panel 70a, or a method for detecting the presence of a touch according to the presence of the approach of the finger or the pen to the touch panel 70a is included depending on the type, either method may be used.

Figure 9C:
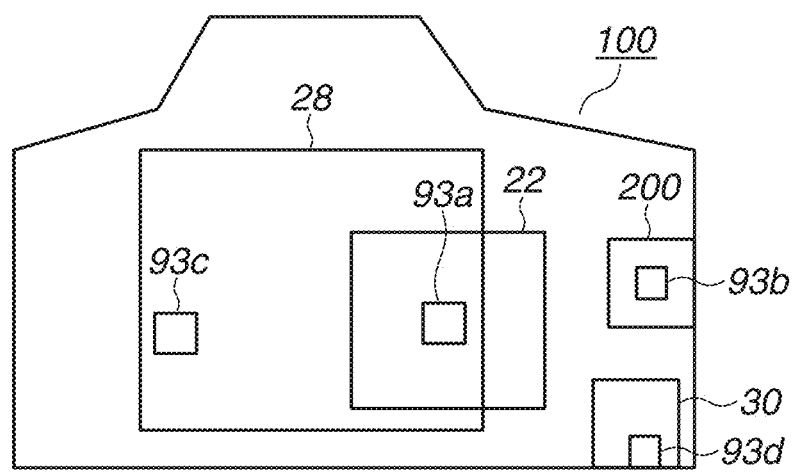

Temperature sensors 93a to 93d (which may be collectively referred to herein as temperature sensors 93) are temperature sensors that measure the temperatures of the surface and the inside of a housing of the digital camera 100, and are temperature acquisition units. FIGS. 9A to 9C illustrate examples of temperature thresholds (temperatures Kl and Kh) for restricting the operation of the digital camera 100 in each of the temperature sensors 93a to 93d, and the placement locations of the temperature sensors 93a to 93d. FIG. 9C is a diagram illustrating the digital camera 100 viewed from the display unit 28 side in the state where the EVF 29 faces up. The temperature sensor 93a is a temperature sensor placed near the image capturing unit 22 and measures the temperature near the device of the image capturing unit 22. The temperature sensor 93b is a temperature sensor placed in the periphery of the connector protected by the terminal cover 40 and measures a temperature for calculating the temperature of the surface of the housing of the digital camera 100. The digital camera 100 avoids the situation where the surface of the housing reaches a certain high temperature (a temperature lower than a limit temperature for protecting devices, specifically about 46° C.), and the user has a low temperature burn by continuing to capture an image while gripping the grip portion 90 at this temperature. The temperature sensor 93c is a temperature sensor placed near the display unit 28 and measures the temperature near the device of the display unit 28. The temperature sensor 93d is a temperature sensor placed inside the cover 202 and measures the temperature near the recording medium 200 or a battery. If each device reaches a high temperature (e.g., 80° C. or above), the device may not normally function, or the image quality may deteriorate. Thus, to prevent these phenomena, the temperature sensors 93a to 93d measure the temperatures. In the present exemplary embodiment, four temperature sensors are placed near four devices. The number of placed sensors and the placement positions of sensors, however, are not limited to these.

Figure 3A:
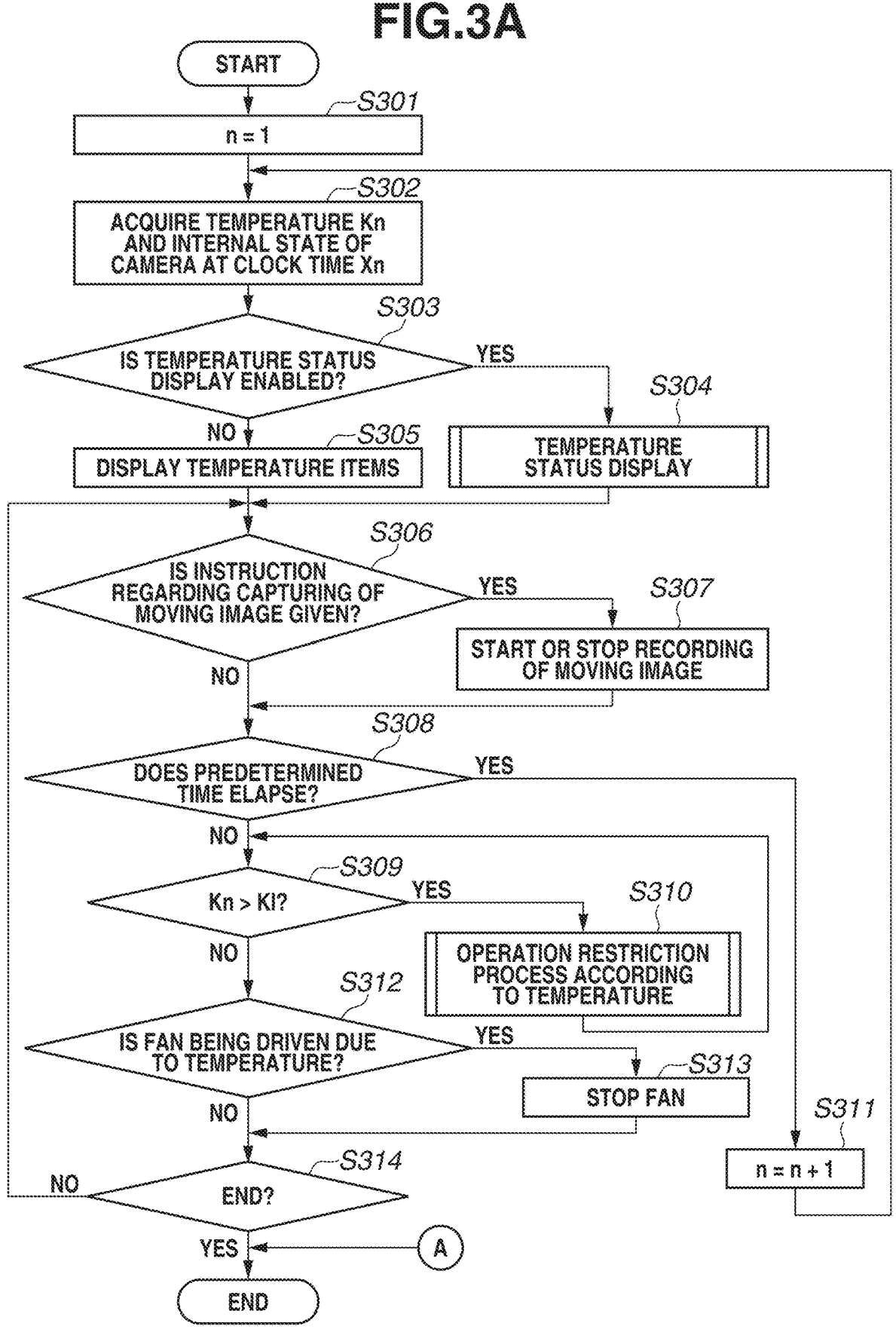
Figure 3C:
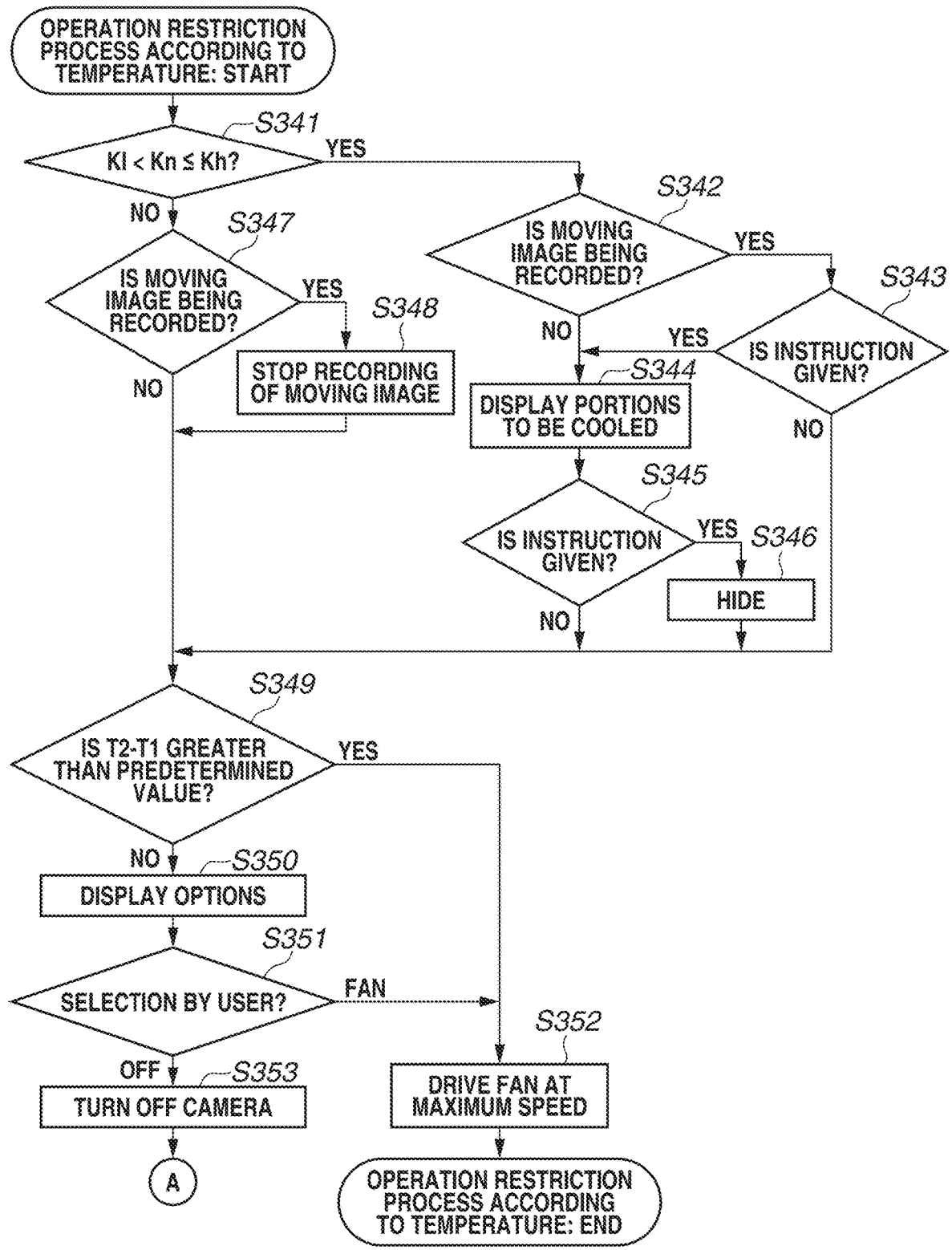

In FIGS. 3A to 3C, control is performed to display the internal state and a change in the temperature of the digital camera 100 on the display unit 28, and when the temperature rises, restrict the operation of the digital camera 100.

FIG. 3A is a control process flowchart if the digital camera 100 is started (turned on) and is in a moving image recording mode in an image capturing standby state. This control process is achieved by the system control unit 50 loading a program stored in the non-volatile memory 56 into the system memory 52 and executing the program. The recording time of this process may be acquired from the number of frames or a timecode described in management information attached to a moving image file, or may be acquired by analyzing the number of frames of the moving image file.

In S301, the system control unit 50 sets a variable n indicating the number of times of acquisition of a temperature that starts to be acquired after the digital camera 100 is turned on and enters the image capturing standby state, to n=1. Then, the system control unit 50 saves the variable n in the system memory 52. If the digital camera 100 is turned off, or if an image capturing mode process (a control process for capturing an image) transitions to another mode process, the variable n is reset.

In S302, the system control unit 50 acquires a temperature Kn and the internal state of the camera 100 at a clock time Xn. The internal state of the camera 100 is a state regarding the capturing of an image, such as the image capturing standby state or an image capturing state (the state where an image is being captured), or the presence or absence of the driving of a Wi-Fi function unit that connects to the Internet via the communication unit 54 or the driving of the fan 92.

In S303, the system control unit 50 determines whether temperature status display is enabled. If the temperature status display is enabled (Yes in S303), the processing proceeds to S304. If the temperature status display is disabled (No in S303), the processing proceeds to S305. The "temperature status display" refers to display regarding a change in the temperature of the digital camera 100. The user can optionally set whether to perform the temperature status display. If the temperature status display is enabled, display indicating the change in the temperature is performed on the display unit 28, and the user can confirm the details of the change in the temperature at a desired timing. Even if the temperature status display is disabled, display regarding the temperature is performed in a superimposed manner on an LV image. In this case, the amount of information is smaller than the details of the change in the temperature. The user, however, can visually confirm the change in the temperature while confirming the LV image.

In S304, the system control unit 50 performs the temperature status display on the display unit 28. Control in this operation will be described below with reference to a control flowchart in FIG. 3B.

In S305, the system control unit 50 displays temperature items that are a simplified display of the change in the temperature, together with the LV image on the display unit 28. FIG. 6C illustrates an example of display performed on the display unit 28 at this time.

In S306, the system control unit 50 determines whether an instruction regarding the capturing of a moving image is given. If the instruction is given (Yes in S306), the processing proceeds to S307. If the instruction is not given (No in S306), the processing proceeds to S308. Specifically, in the image capturing standby state, if the moving image button 77 is pressed, it is determined that the instruction is given. In the state where a moving image is being captured, if the moving image button 77 is pressed, if a mode switch operation is performed, if the reproduction button 79 is pressed, or if the power switch 72 is operated, it is determined that the instruction is given.

In S307, the system control unit 50 starts or stops the recording of a moving image. If a moving image has not been recorded up to this operation (the digital camera 100 has been in the image capturing standby state), the system control unit 50 starts the recording of a moving image, creates a moving image file in the recording medium 200, and records a moving image captured by the image capturing unit 22 with the current setting content. If a moving image has been recorded (the digital camera 100 has been capturing a moving image), then according to the giving of the instruction, the system control unit 50 stops the capturing of the image and performs a closing process (the assignment of attribute information) on a moving image file created in the recording medium 200.

In S308, the system control unit 50 determines whether a predetermined time elapses. If the predetermined time elapses (Yes in S308), the processing proceeds to S311. If not (No in S308), the processing proceeds to S309.

In S309, the system control unit 50 determines whether Kn>Kl. If Kn>Kl (Yes in S309), the processing proceeds to S310. If Kn≤Kl (No in S309), the processing proceeds to S312. If the internal temperature Kn of the digital camera 100 acquired in S302 is higher than a predetermined temperature Kl, the internal temperature Kn may reach a predetermined temperature Kh (Kl<Kh) at which the operation is restricted according to temperature. Thus, the system control unit 50 performs control to lower the temperature Kn of the digital camera 100 (described below in FIG. 3C). The temperatures Kl and Kh will be described below with reference to FIG. 4.

In S310, the system control unit 50 performs an operation restriction process for restricting the operation of the digital camera 100 according to temperature. The operation restriction process will be described below with reference to FIG. 3C.

In S311, the system control unit 50 sets the variable n to n+1 and saves the variable n in the system memory 52. Then, the processing returns to S302. In the present exemplary embodiment, since the determination is Yes in S308 and the process of S311 is performed, predetermined time intervals for recording the temperature of the device and the state of the device are the same time. Alternatively, the predetermined time intervals may differ according to the driving frequency of the temperature sensor 93 or the operating frequency of the system control unit 50.

In S312, the system control unit 50 determines whether the fan 92 is being driven due to a rise in the internal temperature Kn of the digital camera 100. If the fan 92 is being driven (Yes in S312), the processing proceeds to S313. If not (No in S312), the processing proceeds to S314.

In S313, the system control unit 50 stops the driving of the fan 92 due to the rise in the internal temperature Kn of the digital camera 100. Since the determination is No in S309 and the determination is Yes in S312, it is understood that the fan 92 is driven due to the fact that the internal temperature Kn of the digital camera 100 reaches a temperature higher than the predetermined temperature Kh at which the operation is restricted. However, since the current temperature Kn of the digital camera 100 is less than or equal to Kl, the system control unit 50 determines that the internal temperature Kn of the digital camera 100 sufficiently falls. Then, the system control unit 50 stops the driving of the fan 92.

In S314, the system control unit 50 determines whether the processing ends. If the processing ends (Yes in S314), the control flowcharts in FIGS. 3A to 3C end. If not (No in S314), the processing returns to S306.

The end of the processing refers to, for example, the turning off of the digital camera 100 or transition to another mode process other than the image capturing mode process.

FIG. 3B illustrates a control flowchart started if the determination is Yes in S303 in FIG. 3A, i.e., the temperature status display is enabled (S304 in FIG. 3A). In the flowchart illustrated in FIG. 3B, display regarding a change in the temperature displayed on the display unit 28 is performed.

FIG. 4 and FIGS. 5A to 5C illustrate examples of display at this time.

In S321, the system control unit 50 plots the clock time Xn, the internal temperature Kn of the digital camera 100, and the internal state of the digital camera 100 acquired in S302 in FIG. 3A on a graph and displays the graph on the display unit 28.

Figure 4:
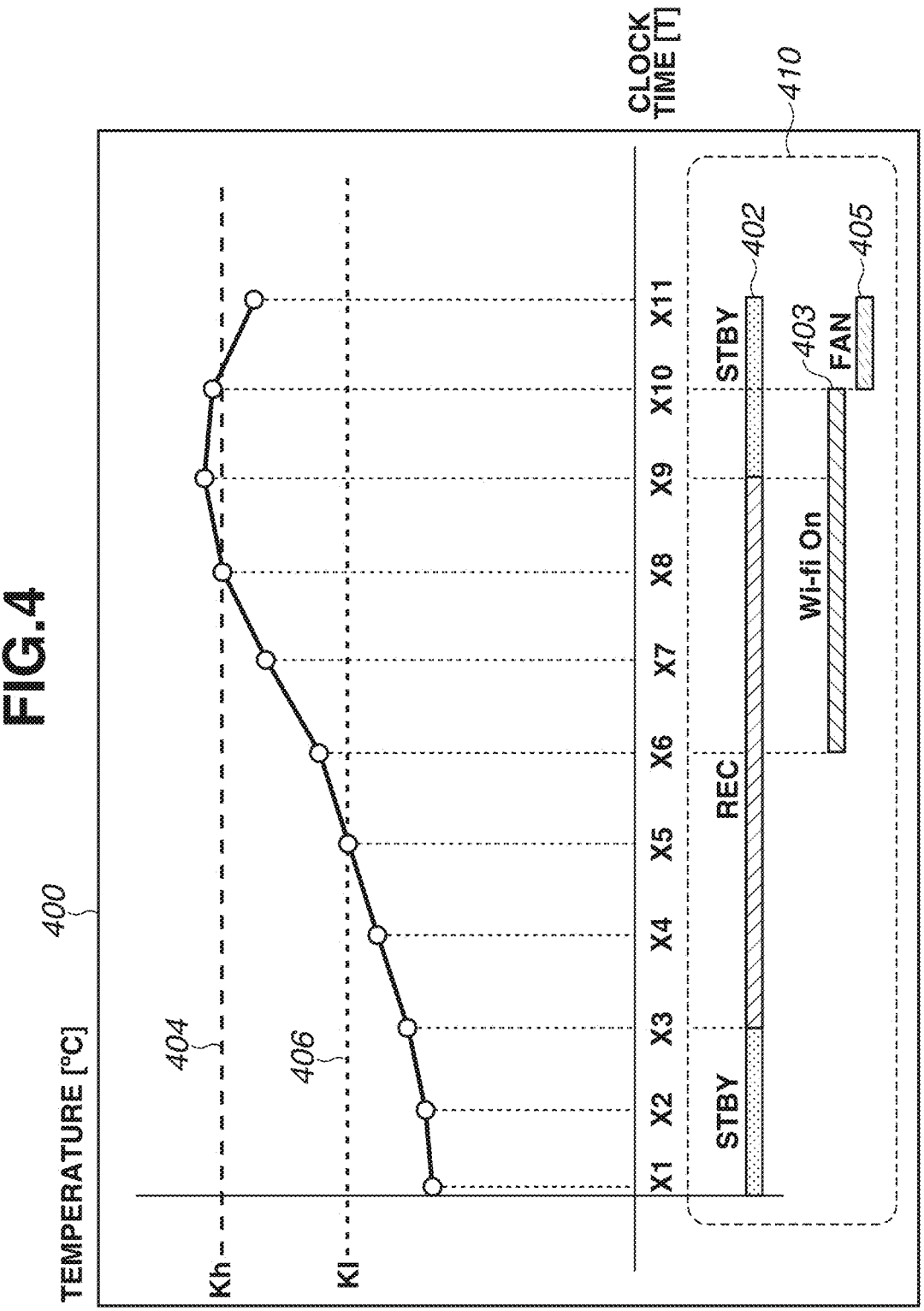
FIG. 4 illustrates a display example of a change over time in the temperature and an internal state of the digital camera.

FIG. 4 illustrates an example of display at this time. A temperature acquired first in a case where the digital camera 100 is turned on and transitions to the image capturing standby state is K1. A clock time when the temperature is acquired is X1. FIG. 4 illustrates a graph displayed when n=11.

In S322, the system control unit 50 determines whether the variable n is greater than 1. If the variable n is greater than 1 (Yes in S322), the processing proceeds to S323. If not (No in S322), the processing proceeds to S324.

In S323, the system control unit 50 connects data Xn−1 and Kn−1 acquired when the variable n is n−1 and data Xn and Kn acquired when the variable n is n with a line. Then, the system control unit 50 displays the resulting data as a line graph. At this time, the system control unit 50 also displays the internal state of the digital camera 100 as a graph.

In S324, the system control unit 50 determines whether the fan 92 is being driven.

If the fan 92 is being driven (Yes in S324), the processing proceeds to S325. If not (No in S324), the control flowchart in FIG. 3B ends.

Figures 5A, 5B:
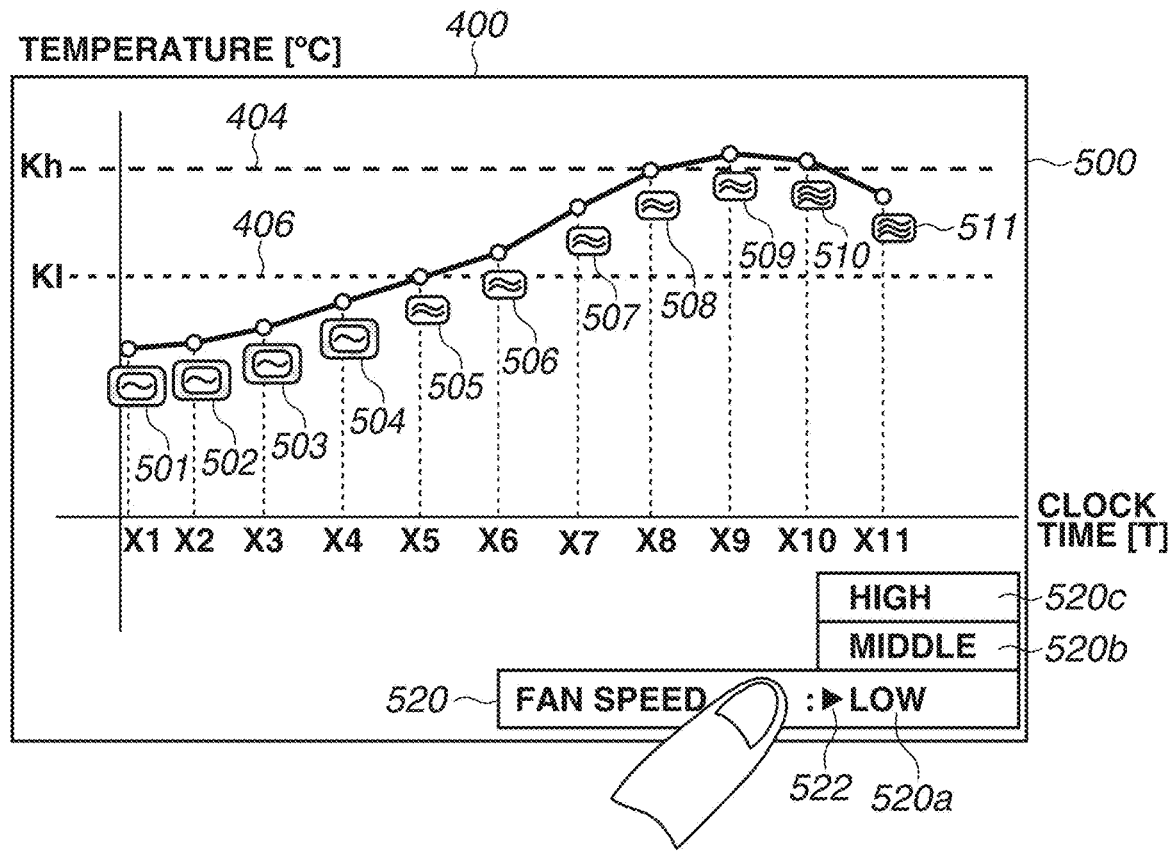
FIGS. 5A to 5C illustrate a display example of a change over time in the temperature and the internal state of the digital camera.

In S325, the system control unit 50 displays display items regarding the driving of the fan 92 at the plotted points (on the plotted graph). FIG. 5A illustrates an example of display at this time.

In S326, the system control unit 50 determines whether the speed of the fan 92 is selected. If the speed of the fan 92 is selected (Yes in S326), the processing proceeds to S327. If the speed of the fan 92 is not selected (No in S326), the processing proceeds to S328. The selection of the speed of the fan 92 refers to, for example, a touch operation of the user on a setting item 520a of a display item 520 in FIG. 5A displayed together with the graph on the display unit 28 or an instruction using the directional pad 74. If the user performs a touch operation on the display item 520 or gives an instruction using the SET button 75, the setting item 520a and setting items 520b and 520c are displayed. The setting items 520a to 520c are candidates for the fan speed that can be set for the fan 92. If the user performs a touch operation on the setting item 520b or 520c or gives an instruction using the directional pad 74, the setting of the speed of the fan 92 is changed. In FIG. 5A, the fan speed is set to low.

In S327, the system control unit 50 highlights an icon corresponding to the same speed as the currently selected speed of the fan 92. Specifically, in FIG. 5A, the system control unit 50 highlights an icon corresponding to the setting item 520a indicated by an indicator 522, i.e., an icon at the time when the fan speed is set to low. The display form of the icon at this time is as illustrated in display items 501 to 504.

In S328, the system control unit 50 determines whether an icon displayed together with the graph and indicating the fan speed is touched by the user. If an icon is touched (Yes in S328), the processing proceeds to S329. If an icon is not touched (No in S328), the control process flowchart in FIG. 3B ends. Then, the processing proceeds to S306 in FIG. 3A. Specifically, if a touch operation is performed on any of the display icons 501 to 504 and display icons 505 to 511 in FIG. 5C (if any of the display icons 501 to 511 is selected), the determination is Yes, and the processing proceeds to S329.

Figure 5C:
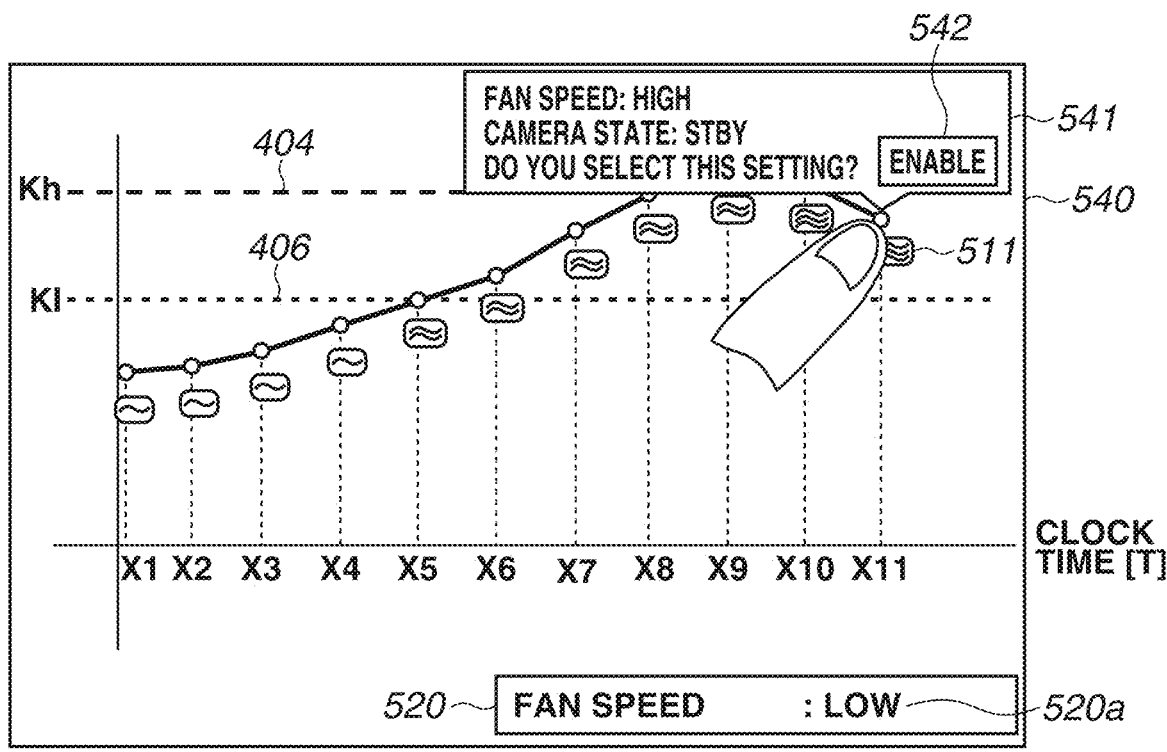

In S329, the system control unit 50 displays information. Since the determination is Yes in S328, the system control unit 50 displays information regarding the internal state of the digital camera 100 at the time of the display item selected by the user. Specifically, according to the fact that the display item 511 in FIG. 5C is touched by the user, the system control unit 50 displays a display item 541 and a selection item 542 in a superimposed manner on the graph on the display unit 28.

In S330, the system control unit 50 determines whether an instruction to change the setting is given. If the instruction is given (Yes in S330), the processing proceeds to S331. If the instruction is not given (No in S330), the control process flowchart in FIG. 3B ends, and the processing proceeds to S306 in FIG. 3A. The system control unit 50 displays the selection item 542 together with the information displayed in S329. If the user selects the selection item 542, the system control unit 50 can collectively change the fan speed and the internal state of the digital camera 100 to those at a clock time X11. Consequently, while referencing the graph, the user can predict a rise and a fall in the temperature in the future and change the setting.

In S331, the system control unit 50 changes the fan speed and the internal state of the digital camera 100.

FIG. 3C is a control flowchart started if the determination is Yes in S309 in FIG. 3A, i.e., Kn>Kl (S310 in FIG. 3A). In the flowchart illustrated in FIG. 3C, when the temperature Kn of the digital camera 100 reaches the predetermined temperature or above, the operation is restricted, and display is performed on the display unit 28. FIGS. 7A to 7D, FIGS. 8A and 8B, and FIG. 10 illustrate examples of display at this time.

In S341, the system control unit 50 determines whether the temperature Kn of the camera 100 acquired in S302 in FIG. 3A is Kl<Kn≤Kh. If Kl<Kn≤Kh (Yes in S341), the processing proceeds to S342. If not (No in S341), the processing proceeds to S347. Although described below with reference to FIG. 4, Kl and Kh are temperature thresholds for restricting the operation of the digital camera 100 or changing temperature display.

In S342, the system control unit 50 determines whether a moving image is currently being recorded. If a moving image is being recorded (Yes in S342), the processing proceeds to S343. If not (No in S342), the processing proceeds to S344.

In S343, the system control unit 50 determines whether an instruction is given by the user. If the instruction is given (Yes in S343), the processing proceeds to S344. If not (No in S343), the processing proceeds to S349. At this time, specifically, an instruction to display portions to be cooled refers to an instruction to the assign button 95.

In S344, the system control unit 50 displays portions to be cooled on the display unit 28. FIGS. 7A to 7D and FIGS. 8A and 8B illustrate examples of display at this time.

In S345, the system control unit 50 determines whether an instruction is given by the user. If the instruction is given (Yes in S345), the processing proceeds to S346. If not (No in S345), the processing proceeds to S349. The instruction is given by the user, whereby the system control unit 50 hides the portions to be cooled displayed in S344 and returns the display to the display of the LV image or other image capturing information desired by the user.

In S346, the system control unit 50 hides the portions to be cooled displayed in S344. Since the instruction is given by the user in S345, it can be assumed that the user is considering returning the display of the portions to be cooled to the display of the LV image or other image capturing information desired by the user.

In S347, similarly to S342, the system control unit 50 determines whether a moving image is currently being recorded. If a moving image is being recorded (Yes in S347), the processing proceeds to S348. If not (No in S347), the processing proceeds to S349.

In S348, the system control unit 50 stops the recording of the moving image and performs a closing process (the assignment of attribute information) on a moving image file created in the recording medium 200. Since the determination is Yes in S309 in FIG. 3A and the determination is No in S341 in FIG. 3C, it is understood that the temperature Kn of the camera 100 is Kn>Kh. Although described below with reference to FIG. 4, Kh is such a high temperature that various failures are highly likely to occur in any of the temperature sensors 93a to 93d. Thus, if the temperature Kn of the camera 100 becomes higher than Kh, the recording of the moving image is stopped even without an instruction given by the user, thereby reducing a decrease in the image quality or the breakdowns of components inside the digital camera 100.

In S349, the system control unit 50 calculates the temperature difference between a temperature T1 measured by a temperature sensor 93 placed at the portion closest to a center portion of the digital camera 100, and a temperature T2 measured by a temperature sensor 93 placed at the portion closest to the exterior of the digital camera 100. If the temperature difference T2−T1 is greater than a predetermined value (Yes in S349), the processing proceeds to S352. If the temperature difference T2−T1 is less than or equal to the predetermined value (No in S349), the processing proceeds to S350. If the determination is Yes in S349, it is understood that there is a great difference between the temperature of the exterior (or outside air) of the digital camera 100 and the temperature inside the digital camera 100. Consequently, the fan 92 is driven at the maximum speed without turning off the digital camera 100, thereby taking outside air into the digital camera 100. This can cool the inside of the digital camera 100 more efficiently. If the determination is Yes in S349, the fan 92 is driven at the maximum speed (described below in S352) without displaying options regarding a cooling method described below in S350. This is because the temperature difference T2−T1 is greater than the predetermined value, and it is assumed that the digital camera 100 can be cooled more effectively and in a shorter time by driving the fan 92 than by turning off the digital camera 100. The present disclosure, however, is not limited to this. That is, even if the temperature difference T2−T1 is greater than the predetermined value, the options regarding the cooling method described below in S350 may be displayed. As the predetermined value, a value of about 30° C. to 40° C. is assumed. The predetermined value, however, depends on the size of the digital camera 100, and therefore is not limited to this.

If, on the other hand, the determination is No in S349, it is understood that the temperature difference between the outside and the inside of the digital camera 100 is not very great. Thus, the digital camera 100 can be cooled more efficiently by turning off the digital camera 100 and reducing heat generation due to the continuation of the turning on of the digital camera 100 than by driving the fan 92. In the present exemplary embodiment, the temperature T2 is a temperature measured by the temperature sensor 93b or 93d (or both the temperature sensors 93b and 93d) considered capable of measuring the temperature of the exterior (outside air), and the temperature T1 is a temperature measured by the temperature sensor 93a.

In S350, the system control unit 50 displays options on the display unit 28. FIG. 10 illustrates an example of display at this time. Since the determination is No in S349, the temperature difference T2−T1 is less than or equal to the predetermined value. Thus, no matter which of the cooling by driving the fan 92 (described below in S352) and the cooling by turning off the digital camera 100 is selected, the degree of fall in the temperature Kn of the digital camera 100 does not greatly differ. However, if the digital camera 100 remains in the image capturing standby state after the recording of a moving image is stopped, the temperature Kn of the digital camera 100 falls so slowly that the recording of a next moving image cannot be started. Thus, options as illustrated in FIG. 10 are displayed on the display unit 28, and the user is allowed to select either of the options.

In S351, the system control unit 50 determines which of the options is selected by the user. If the fan rotation is selected, the processing proceeds to S352. If the turning off of the digital camera 100 is selected, the processing proceeds to S353.

In S352, the system control unit 50 starts the driving of the fan 92 in the state where the rotational speed of the fan 92 is the maximum speed, and the processing returns to S309 in FIG. 3A. The fan 92 driven in this operation continues to be driven until the temperature Kn of the digital camera 100 is less than or equal to the predetermined threshold (Kn≤K1). By such control, it is possible to cause the internal temperature Kn of the digital camera 100 to sufficiently fall. Even if the user resumes the recording of a moving image, the temperature Kn of the digital camera 100 does not instantly reach the temperature Kh at which the operation is restricted. Thus, it is possible to record the moving image for a longer time.

In S353, the system control unit 50 turns off the digital camera 100. Then, the control flowchart in FIG. 3C ends, and the control flowchart in FIG. 3A also ends.

FIG. 4 illustrates display example 1 of the graph displayed as the temperature status display on the display unit 28. This graph indicates the temperature Kn and the internal state of the digital camera 100 at clock times. The horizontal axis represents time (Xn), and the vertical axis represents temperature (Kn). The time when the digital camera 100 is turned on is X0. That is, every time the user turns off the digital camera 100, the graph is reset. As described with reference to the control flowchart in FIG. 3A, the variable n is incremented according to the lapse of the predetermined time or a change in the internal state of the digital camera 100. A dotted line 404 indicates the temperature Kh. A dotted line 406 indicates the temperature Kl. The temperatures Kh and Kl are temperature thresholds for preventing the breakdowns of devices included in the digital camera 100, preventing a decrease in the image quality of a captured moving image, or ensuring the safety of the user holding the digital camera 100. As can be seen from the graph in FIG. 4, the temperatures Kh and Kl have a relationship of Kh>Kl. Thresholds are provided at two levels, thereby recognizing a rise and a fall in the temperature Kn of the digital camera 100 in a stepwise manner and informing the user of the rise and the fall. The temperatures Kl and Kh are criterion temperatures for avoiding reaching an actual operation restriction temperature. Each of the temperatures Kl and Kh may be a temperature at which a device actually breaks down or the image quality of a moving image actually decreases, may be a lower temperature, or may have a range. The dotted line 406 may also be displayed as a band having a predetermined width.

Temperatures K1 to K4 at clock times X1 to X4 are lower than Kl (Kn<Kl). From the clock time X1 to the clock time X3, the internal state of the digital camera 100 is a recording standby state. At the clock time X3, if the recording of a moving image starts, the internal state of the digital camera 100 changes to the state where the moving image is being recorded. At the clock time X4, the internal state of the digital camera 100 is the state where the moving image is being recorded. The internal state of the digital camera 100 is displayed below the graph of the temperature status display (in a region 410). Specifically, the internal state can be seen by performing band-like display as illustrated in state display 402. In the moving image recording standby state, "STBY" is displayed. In the state where the moving image is being recorded, "REC" is displayed. From the clock time X1 to the clock time X4, the recording of the moving image starts at the clock time X3, and the internal state of the digital camera 100 is the recording state from the clock time X3 onward ("REC" is displayed in the graph). The driving of the image capturing unit 22 and the image processing unit 24 due to the start of the recording of the moving image at the clock time X3 increases the power consumption of these devices and increases the degree of change (the rate of change) in the internal temperature Kn of the digital camera 100.

Temperatures K5 to K8 at clock times X5 to X8 are Kl or above and Kh or below (Kl≤Kn≤Kh).

The internal state of the digital camera 100 is the state where the moving image is being recorded ("REC"). At the clock time X6, Wi-Fi is turned on by the user. Thus, "Wi-fi On" is displayed below the graph as illustrated in state display 403 in FIG. 4.

Temperatures K9 and K10 at clock times X9 and X10 are temperatures higher than Kh (Kn>Kh).

According to the fact that the temperature Kn reaches a temperature higher than Kh, i.e., at the clock time X9, if the moving image is being recorded, the recording of the moving image is stopped, and the digital camera 100 transitions to the recording standby state. Thus, as illustrated in FIG. 4, the display of the internal state of the digital camera 100 is also changed. In FIG. 4, the temperature Kn reaches a temperature higher than Kh in the state where the moving image is being recorded, and therefore, the recording of the moving image is stopped, and the operation of the digital camera 100 is restricted, thereby bringing the digital camera 100 into the standby state. The present disclosure, however, is not limited to this. If the temperature Kn becomes higher than Kh in the recording standby state, Wi-Fi or the digital camera 100 is turned off, or the driving of the fan 92 is started. At the clock time X10, the temperature K10 continues to be higher than the temperature Kh from the clock time X9. Thus, the fan 92 is driven. Wi-Fi is also turned off. The band-like display of the state display 403 is hidden. Thus, it is understood that Wi-Fi is turned off. If the state where the temperature Kn is higher than the temperature Kh continues for a long time, it is highly likely that the devices of the digital camera 100 are influenced and break down. Thus, in addition to the control for stopping the recording of the moving image at the clock time X9, the fan 92 is driven, thereby lowering the temperature Kn of the digital camera 100. The driving state of the fan 92 at this time is indicated by state display 405 ("FAN"). Since the state display 405 is not displayed until the clock time X10, the fan 92 is not driven until the clock time X10. As described above, since Kh is the temperature at which the restriction of the operation is started to prevent the breakdown of the digital camera 100, the operation of the digital camera 100 is restricted according to the fact that the temperature Kn becomes higher than the threshold Kh even if a user operation is not performed.

A temperature K11 at a clock time X11 is Kl or above and Kh or below (Kl≤Kn≤Kh). It is understood that the temperature K11 reaches Kh or below by driving the fan 92 at the clock time X10. As described above, the user can visually confirm both the temperature Kn and the internal state of the digital camera 100. Consequently, the operation is restricted or the fan 92 is driven, whereby the user can predict to what extent the temperature Kn of the digital camera 100 will fall so that the digital camera 100 can resume the recording of a moving image.

Another device state that influences the device temperature may be recorded. For example, a video recording setting state such as a recording format, e.g., a file format or a codec, a recording resolution, or a frame rate may be recorded. The lighting state of a display unit included in the display unit 28 or the outside-viewfinder display unit 43, or a lighting brightness state indicating the brightness when the display unit lights up may be recorded. The communication status of an external input/output terminal included in the recording medium I/F 18 may be recorded. The attachment state of an external device such as a lens, e.g., the lens unit 150, a tripod, various terminals, a handle, a flash, an illumination, a rig, a mud guard, a filter, or a housing, or the insertion/removal state of a recording medium such as the recording medium 200 may be recorded. A power saving mode state where power consumption differs, or a high performance mode state where performance is improved by making power consumption higher than normal may be recorded. A cooling mode state where the digital camera 100 operates by giving priority to the cooling of the device temperature, instead of a normal operation, may be recorded. The state of the driving mode of a sensor that differs in the update cycle of the sensor or a method for reading a signal of a pixel, such as the image capturing unit 22 or the A/D converter 23, may be recorded. The power supply state of a battery included in the power supply unit 30, an AC power supply, or Universal Serial Bus (USB) power feeding may be recorded. A surrounding environment state estimated by acquiring the weather or the air temperature at the current location using the temperature sensor 93 or through external communication by the communication unit 54, or estimated from the stop value of the lens unit 150, the shutter speed of the shutter 101, the sensitivity of the image capturing unit 22, or an exposure value Ev obtained from an image capturing result may be recorded.

As described above, from the temperature status display (the graph) illustrated in FIG. 4, the user can understand that the slope of the line graph gradually becomes greater upward from the clock time X3 and becomes even greater upward from the clock time X6. From the slope of the graph and the information regarding the internal state of the digital camera 100, the user can understand that the recording of a moving image starts at the clock time X3, and Wi-Fi is turned on at the clock time X6. That is, the user can visually confirm that the internal temperature Kn of the digital camera 100 greatly rises by starting wireless communication using Wi-Fi. The user can understand that the internal temperature Kn rises also by starting the recording of the moving image, although the rise rate is smaller than by starting the wireless communication using Wi-Fi.

In contrast, the slope of the graph changes downward from the clock time X9 and becomes even greater downward from the clock time X10. Based on these changes, the internal temperature Kn can fall by stopping the recording of the moving image. The fall in the temperature Kn can be further promoted by driving the fan 92.

The temperature status display as illustrated in FIG. 4 is performed, whereby the user can visually confirm the state where the temperature rises in a case where the internal state of the digital camera 100 is changed. Further, changes in not only the state of the recording of the moving image but also the communication state of wired or wireless communication and the driving state (the cooling state) of the fan 92 are displayed together with the temperature status display. Consequently, the user can visually confirm which function contributes to a rise and a fall in the internal temperature of the digital camera 100 and to what extent the function contributes. Even in a case where the temperature exceeds a predetermined threshold, and the digital camera 100 becomes unable to record a moving image, the user can understand which function should be changed to what state to cool the digital camera 100 more effectively. The user can predict how long the digital camera 100 should be left to cool so that the digital camera 100 can resume the recording of a moving image. Thus, it is possible to record a moving image more efficiently without wasting time.

That is, based on display example 1 of the temperature status display according to the present exemplary embodiment, the internal temperature and the internal state of the digital camera 100 at each clock time are recorded and displayed, whereby the user can visually confirm an internal state that causes a change in the temperature. Further, the user can predict and imagine what countermeasure should be taken to prevent a rise in the temperature or cause the temperature to efficiently fall when the temperature rises. That is, it is possible to assist the user in selecting a countermeasure to control the temperature.

As the internal state of the digital camera 100 displayed together with the temperature status display, the state of the recording of the moving image, the communication state, and the driving state (the cooling state) of the fan 92 have been described. Some embodiments, however, are not limited to these. For example, the state of an external connection with an external display device (High-Definition Multimedia Interface (HDMI®)) through wired or wireless communication, and a power saving state that is a state regarding the power consumption of the digital camera 100, such as the setting content of auto power off, can also be displayed. A recording medium state that is the state of the specification (the communication speed or the capacity) of the recording medium 200, and a display state regarding whether to display the LV image as a high-quality image of 4K or 8K on the display unit 28 can also be displayed. The driving state of the image capturing unit 22 regarding the presence or absence of the driving of the image capturing unit 22, i.e., the presence or absence of image capturing using the image capturing unit 22, can also be displayed together with the temperature status display similarly performed on the display unit 28.

FIGS. 5A to 5C illustrate display example 2 of the temperature status display (the graph) performed on the display unit 28. In the graph, the vertical axis, the horizontal axis, clock times X1 to X11, and temperatures K1 to K11 are similar to those in FIG. 4. In FIGS. 5A to 5C, a case is considered where the fan 92 is driven during the entire time from the clock time X1 to the clock time X11. FIG. 5A illustrates the display in S325 and S327 in FIG. 3B. FIG. 5C illustrates the display in S329 in FIG. 3B.

In a display item 500 in FIG. 5A, unlike the graph of the temperature status display in FIG. 4, display items 501 to 511 indicating the setting states of the fan speed at the respective clock times and a display item 520 for the fan speed are displayed. The display items 501 to 511 in the display item 500 reference information regarding the internal state of the digital camera 100 loaded into the memory 32. The display item 520 illustrated in FIG. 5A indicates options that can be set and the current setting regarding the speed setting of the fan 92, and is displayed according to selection (e.g., a touch-on) by the user. In a state where the display item 520 is not selected by the user (FIG. 5C), setting items 520b and 520c as options for the speed setting of the fan 92 and an indicator 522 are not displayed. That is, in a case where the user selects (performs a touch-on on) a setting item 520a, the setting items 520b and 520c are displayed. According to the fact that the user selects any of the setting items 520a to 520c, the indicator 522 is displayed for the selected setting item, and the speed setting of the fan 92 is changed. If the indicator 522 moves to the setting item 520b ("middle") by a user instruction, the display items 505 to 509 are highlighted. Similarly, if the indicator 522 moves to the setting item 520c ("high"), the display items 510 and 511 are highlighted. If the user performs a determination process on a fan speed where a cursor is displayed (performs a touch operation again or presses the SET button 75 at the display position of the cursor), the user can change or determine the fan speed. By such display, the user can visually confirm to what extent the internal temperature Kn of the digital camera 100 will change if the speed of the fan 92 is changed. The fan speed can be changed without opening a setting menu screen. This can save effort.

A display item 530 in FIG. 5B is a table illustrating information regarding plot data included in the display item 500 illustrated in FIG. 5A. Every time the setting of the temperature Kn or the fan speed is acquired, the display item 530 is updated and loaded into the memory 32. A "temperature" in the display item 530 is acquired from the temperature sensor 93, and a "fan" described in the display item 530 is information acquired from the setting state of the fan 92 stored in the non-volatile memory 56. If the setting state of the fan 92 is changed on the setting menu screen by the user, the setting state of the fan 92 is loaded into the non-volatile memory 56, and the setting is held also when the digital camera 100 is started next time. The display items 501 to 504 indicate that the speed setting of the fan 92 is low. The display items 505 to 509 indicate that the speed setting of the fan 92 is middle. The display items 510 and 511 indicate that the speed setting of the fan 92 is high. A "clock time" in the display item 530 indicates the clock time when the internal temperature Kn of the digital camera 100 or the speed setting of the fan 92 is acquired via the temperature sensor 93.

In the present exemplary embodiment, the display item 530 has been taken as an example where the number of pieces of plot data displayed in the display item 500 is 10, and information is updated every 10 minutes. Some embodiments, however, are not limited to this. Although data is plotted on the display item 500 every 10 minutes, the interval for plotting data is not limited to 10 minutes. Not only based on time, but also in a case where the temperature Kn reaches the temperature Kl, above, or below, or Kh, above, or below, or in a case where the internal state of the digital camera 100 changes, data may be plotted.

If the user selects the setting item 520a (if the indicator 522 is displayed for the setting item 520a), the display items 501 to 504 indicating corresponding fan speeds are highlighted. In the present exemplary embodiment, a display item is highlighted, thereby making it easy for the user to visually confirm the display item. If the user changes the speed setting of the fan 92 to middle (the setting item 520b), the display items 505 to 509 are highlighted. Similarly, if the user changes the speed setting of the fan 92 to high (the setting item 520c), the display items 510 and 511 are highlighted.

FIG. 5C illustrates an example of display performed on the display unit 28 in a case where any of the display items 501 to 511 displayed in the display item 500 is selected by the user. According to the fact that the display item 511 is selected (subjected to a touch-on) by the user, a display item 541 is displayed in a superimposed manner on the display item 500. The display item 541 indicates the setting content of the speed of the fan 92 and the internal state of the digital camera 100 at the clock time X11 indicated by the display item 511 selected by the user. If a selection item 542 is selected, the setting content and the internal state can be collectively changed to the states indicated by the display item 541.

In the present exemplary embodiment, the speed setting of the fan 92 can be set to high, middle, and low. Alternatively, a setting for automatically changing the speed setting of the fan 92 according to the internal temperature Kn of the digital camera 100 (e.g., auto) may be included.

In the present exemplary embodiment, the relationship between temperature and time is displayed as a line graph. Some embodiments, however, are not limited to this. Alternatively, as in a display item 540, if a touch on any of indicators or peripheral regions of the display items 501 to 511 is detected on the touch panel 70a included in the operation unit 70, detailed information may be displayed, and the fan setting may be able to be directly changed to a fan setting at the touched point. For example, if the fan speed setting state 511 is touched in the display item 540, the fan setting may be displayed as illustrated in the display item 541, and if the selection item 542 is touched, the setting may change. If the selection item 542 is pressed in the display item 540, the fan speed displayed in the lower right of the screen of the display item 540 is changed from "low" to "high". By thus directly making a setting by a touch, it is possible to confirm a suitable setting and also easily reflect the setting. The display item 541 is not limited to pop-up display as illustrated in FIG. 5C. The display item 541 may be displayed above the display item 520, i.e., below the graph.

As described with reference to FIGS. 5A to 5C, the temperature status display as illustrated in display example 2 is performed, whereby the user can visually confirm the presence or absence of the driving of the fan 92 at each clock time in the graph, and not only the internal state of the fan 92 but also the internal state of the digital camera 100. Even if the user does not store a setting parameter at each clock time, the user can recognize the setting content at each clock time and also recognize what influence the setting parameter and the internal state of the digital camera 100 at each clock time have on a change in the internal temperature. Further, the user can change a setting parameter while referencing the graph. Thus, the user can make a change to cause the internal temperature of the digital camera 100 to change (fall) more efficiently without feeling troublesome.

Figure 6A:
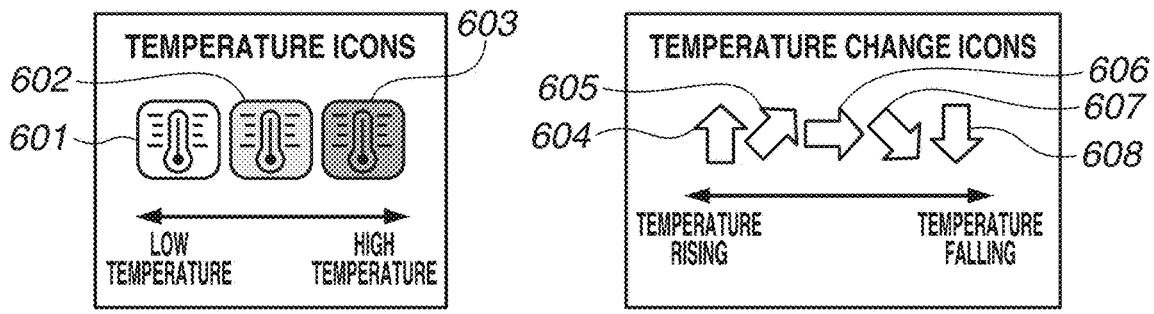
FIGS. 6A to 6C illustrate a display example of a change over time in the temperature and the internal state of the digital camera.
Figure 6B:
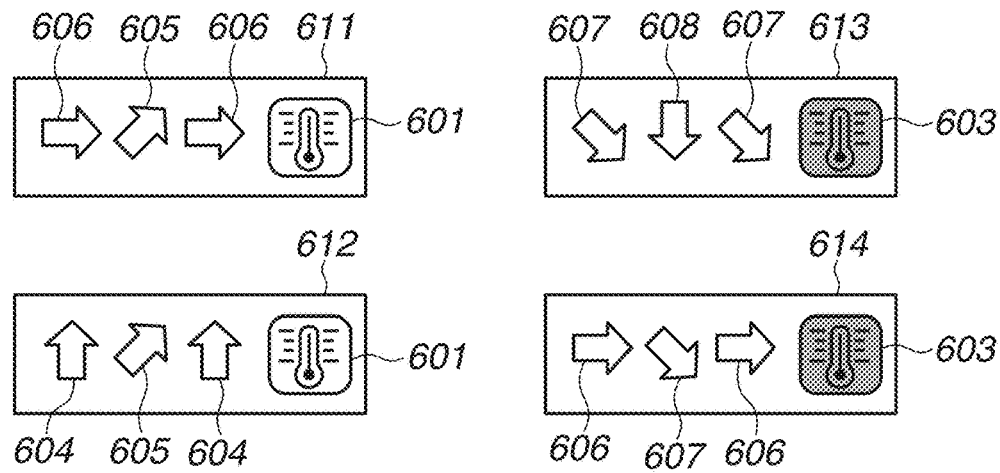
Figure 6C:
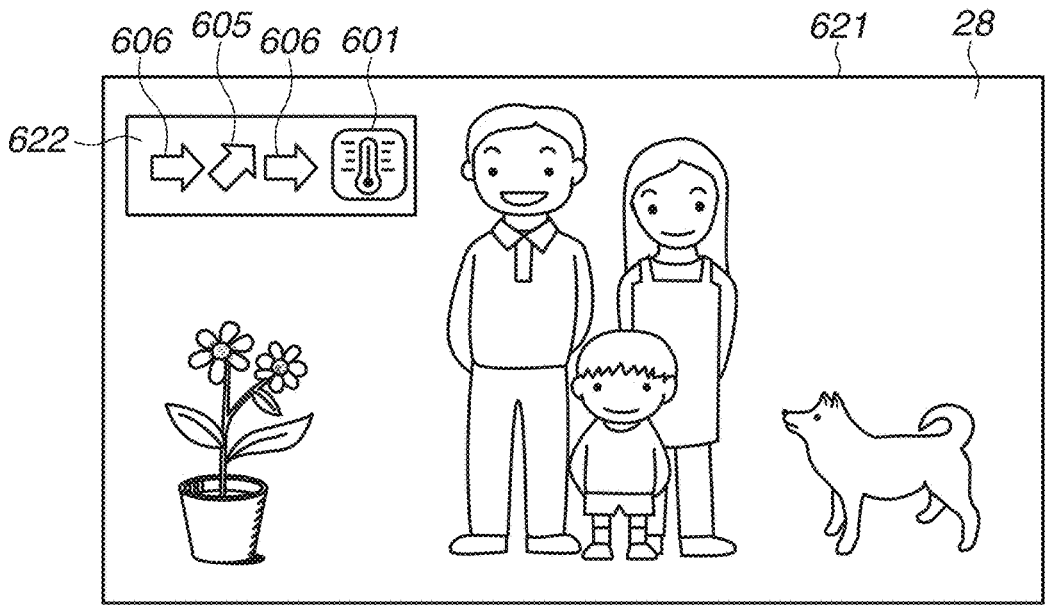

FIGS. 6A to 6C illustrate display example 3 of the temperature status display performed on the display unit 28. FIGS. 6A to 6C as display example 3 illustrate display items indicating the current temperature and the degree of change in the temperature that are the temperature status display in a superimposed manner on the LV image displayed on the display unit 28.

FIG. 6A illustrates an example of display of the current temperature and the degree of change in the temperature of the digital camera 100.

Based on the temperatures Kl and Kh (Kl<Kh) described above with reference to FIG. 4, it is determined whether the current temperature is lower or higher than the temperatures Kl and Kh. Then, the current temperature is displayed as a temperature icon. For example, if the temperature Kn measured at the time of S302 is Kn<Kl, display as illustrated in a display item 601 is performed. If Kl≤Kn<Kh, display as illustrated in a display item 602 is performed. If Kn≥Kh, display as illustrated in a display item 603 is performed. That is, in the display item 601, a temperature sensor icon is displayed in white. As the temperature becomes higher, the colors of temperature sensor icons are changed. In the display item 602, a temperature sensor icon is displayed in light red. In the display item 603, a temperature sensor icon is displayed in red. Consequently, based on changes in the display forms of the display items (the temperature sensor icons), the user can visually confirm that the temperature is rising or falling. Particularly regarding a rise in the temperature, the state where the temperature comes close to a temperature that influences the driving of the digital camera 100 is represented in red, thereby indicating a warning to the user.

The degree of change in the temperature is indicated by display items 604 to 608 as temperature change icons. If the temperature is rapidly rising, the display item 604 is displayed on the display unit 28. If the temperature is slowly rising, the display item 605 is displayed on the display unit 28. If a change in the temperature is small or the temperature does not change, the display item 606 is displayed. If the temperature is slowly falling, the display item 607 is displayed. If the temperature is rapidly falling, the display item 608 is displayed.

FIG. 6B illustrates an example of display of temperature information displayed in a superimposed manner on the LV image. The temperature information includes a temperature icon (any of the display items 601 to 603) determined based on the temperature Kn at the clock time Xn and temperature change icons (the display items 604 to 608) determined based on the temperatures at clock times Xn−2, Xn−1, and Xn. If there are not the clock times Xn−2 and Xn−1, only a temperature change icon for the temperature at the clock time Xn is displayed.

Display items 611 and 612 illustrate examples of a case where the temperature Kn of the digital camera 100 is rising. The display item 611 includes the display item 601 indicating the temperature at the current time and the display items 606, 605, and 606 indicating the degree of change in the temperature. From the display item 601, the user can understand that the temperature Kn of the digital camera 100 at the current time is Kn<Kl and is a temperature sufficiently low relative to a temperature that influences the breakdown of the camera 100. From the display items 606, 605, and 606, the user can understand that the temperature Kn of the digital camera 100 is rising, but the degree of change (the rate of change) is not very great. Thus, the user can understand that even if the processing that is being performed in the current state of the digital camera 100 is continued, it is less likely that the temperature Kn reaches the temperature Kh at which the operation is restricted in a short time.

The display item 612 includes the display item 601 indicating the temperature at the current time and the display items 604, 605, and 604 indicating the degree of change in the temperature. From the display item 601, the user can understand that the temperature Kn of the digital camera 100 at the current time is Kn<Kl and is a temperature sufficiently low relative to a temperature that influences the breakdown of the camera 100. From the display items 604, 605, and 604, the user can understand that the temperature Kn of the digital camera 100 at the current time is a low temperature, but if the processing that is being performed in the current state of the digital camera 100 is continued, it is highly likely that the temperature Kn reaches the temperature Kh at which the operation is restricted in a short time.

Display items 613 and 614 illustrate examples of a case where the user is cooling the overheated device. The display item 613 includes the display item 603 indicating the temperature at the current time and the display items 607, 608, and 607 indicating the degree of rise (fall) in the temperature. From the display item 603, the user can understand that the temperature Kn of the digital camera 100 at the current time is Kn>Kh and reaches a temperature that influences the breakdown of the camera 100 or is such a high temperature as to reach the temperature. From the display items 607, 608, and 607, the user can understand that the temperature Kn of the digital camera 100 is falling, and the degree of fall (the rate of cooling) is also great. Thus, the user can imagine that if the cooling is continued by maintaining the current state of the digital camera 100, the temperature Kn of the digital camera 100 reaches a low temperature in a short time, and the digital camera 100 can resume the recording of a moving image.

The display item 614 includes the display item 603 indicating the temperature at the current time and the display items 606, 607, and 606 indicating the degree of rise (fall) in the temperature. From the display item 603, the user can understand that the temperature Kn of the digital camera 100 at the current time is Kn>Kh and reaches a temperature that influences the breakdown of the camera 100 or is such a high temperature as to reach the temperature. From the display items 606, 607, and 606, the user can understand that the temperature Kn of the digital camera 100 tends to fall, but the degree of fall (the rate of cooling) is not very great. Thus, the user can imagine that even if the cooling is continued by maintaining the current state of the digital camera 100, it takes time until the temperature Kn of the digital camera 100 reaches such a sufficiently low temperature that the digital camera 100 can resume the recording of a moving image.

FIG. 6C illustrates an example where the temperature information described with reference to FIGS. 6A and 6B is displayed in a superimposed manner on the LV image. A display item 622 is displayed in a superimposed manner on an LV image 621 displayed on the display unit 28. In either of the state where a moving image is being recorded and the standby state, the user can confirm the LV image and also confirm the temperature information regarding the digital camera 100. Consequently, the user can determine whether to continue the recording of the moving image, or suspend the recording of the moving image and cool the digital camera 100. If the digital camera 100 is to be cooled, the user can consider whether to further increase the rate of cooling relative to the current setting state. The user can visually confirm the degree of change in the temperature over time and therefore can also adjust the schedule or the plan of the recording of the moving image after that.

In the present exemplary embodiment, a temperature is displayed as an icon. Alternatively, a temperature may be displayed as gauge display of the current temperature relative to an upper limit temperature. Yet alternatively, the user may be notified of information by changing the light emission color of a tally light included in the display unit 28. The user may be notified of a change in the temperature not only by using an arrow as a temperature change icon, but also by switching the blinking interval of the tally light included in the display unit 28. In the present exemplary embodiment, the temperature difference per unit time is calculated. Alternatively, the time interval for calculating the temperature difference may be changed. The number of temperature change icons placed at this time may be three as in the present exemplary embodiment, or may increase or decrease.

In the present exemplary embodiment, the LV image 621 and the temperature information are displayed on the display unit 28. Alternatively, the LV image 621 and the temperature information may be displayed on the outside-viewfinder display unit 43 or the EVF 29. Yet alternatively, the user may be notified of the temperature information by changing the blinking color or the blinking interval of the tally light included in the display unit 28. When a terminal such as a personal computer (PC) or a smartphone connects to the system control unit 50 via the communication unit 54, the temperature information may be sent to the terminal, and the user may be notified of the temperature information. In the present exemplary embodiment, the user is notified of both temperature icons and temperature change icons as the temperature information. Alternatively, the user may be notified of only temperature change icons.

In display example 3 of the temperature status display described with reference to FIGS. 6A to 6C, the user can visually confirm a change over time in the internal temperature of the digital camera 100 while confirming the LV image. Consequently, the user can confirm a change in the temperature while confirming a composition without feeling troublesome in the state where an image is being recorded or in a recording preparation state. This is user-friendly.

As in the display control described with reference to FIGS. 3A and 3B and FIGS. 4 to 6C, a change over time in the internal temperature and the internal state of the digital camera 100 are displayed as a graph and icons, whereby the user can visually confirm the difference between a temperature at which the operation is restricted and the current temperature. Based on the temperature status display, the user can assume a countermeasure that should be taken next to prevent a rise in the temperature or cause the temperature to fall (cool the digital camera 100). Further, when the temperature reaches the temperature at which the operation is restricted, then based on the graph, the user can assume how much cooling time should elapse in the future before the temperature falls to a temperature at which the digital camera 100 can resume the recording of a moving image. The user can also approximate the plan and the schedule of the capturing of the moving image.

The temperature status display described with reference to FIGS. 3A and 3B and FIGS. 4 to 6C may be not only displayed on the display unit 28 as described above, but also displayed on the EVF 29 or the outside-viewfinder display unit 43. The temperature status display can also be performed on an external output apparatus using an HDMI® through wired or wireless communication.

Figure 7A:
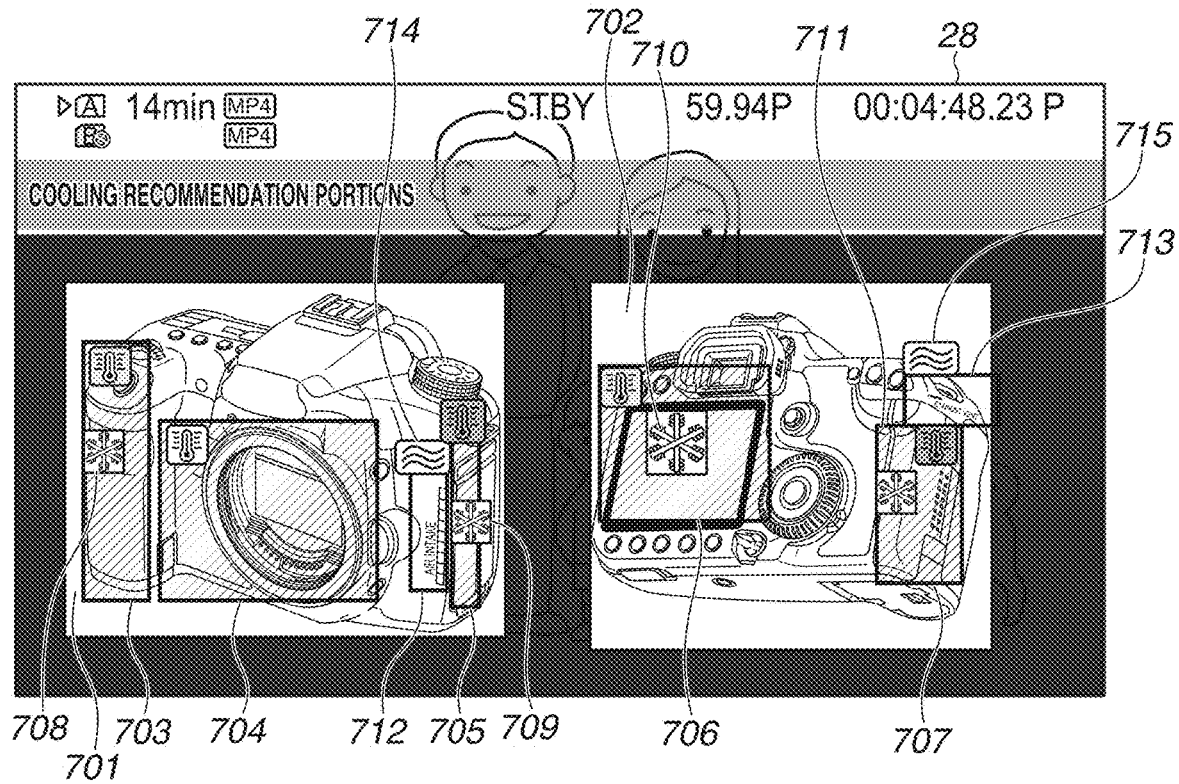
FIGS. 7A to 7D illustrate a display example illustrating cooling recommendation portions of the digital camera.
Figure 7B:
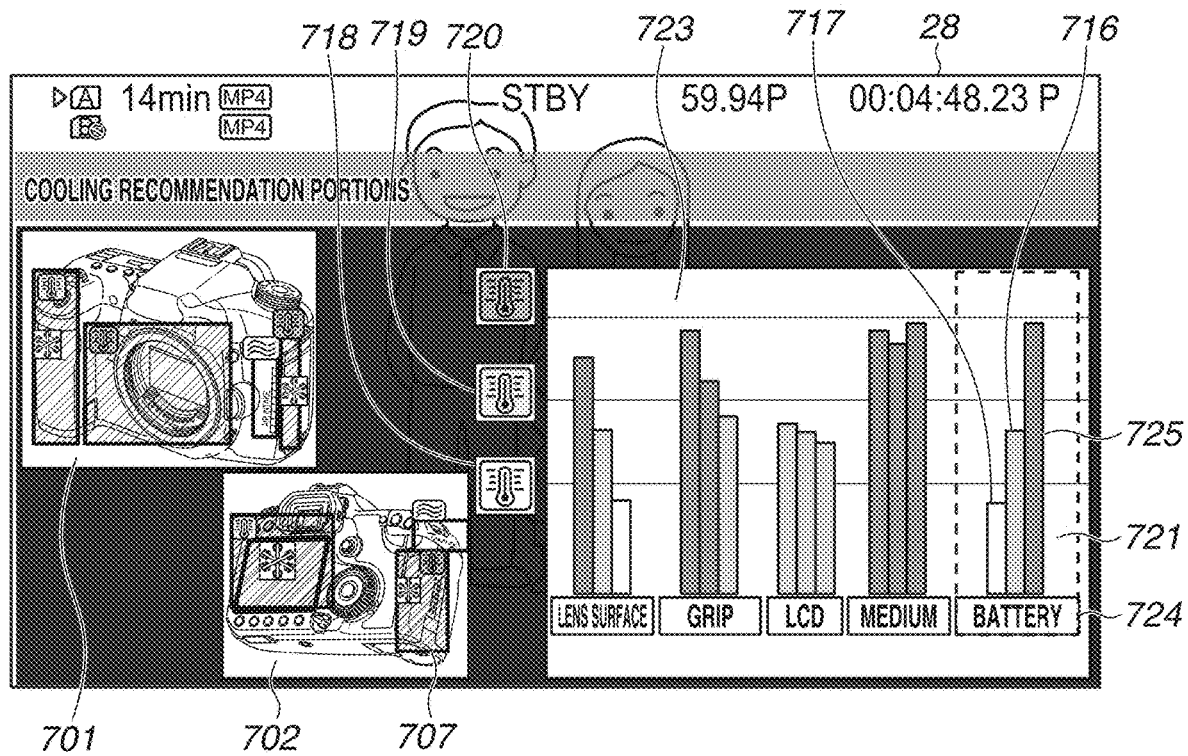
Figure 7C:
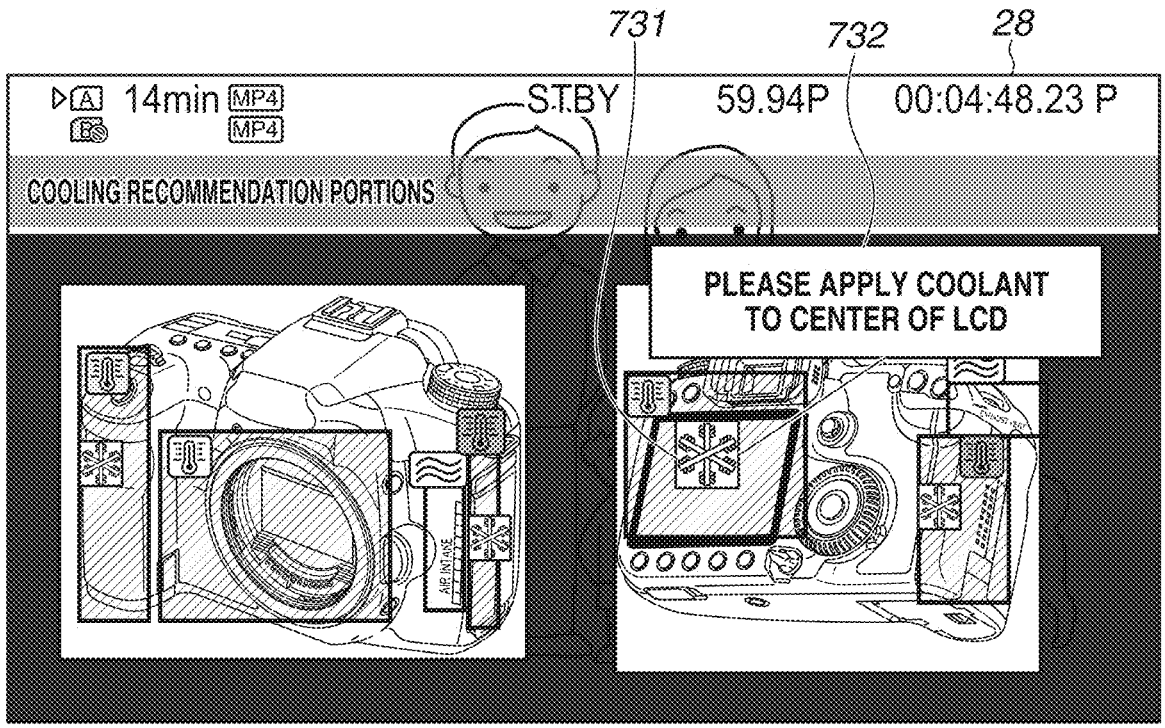
Figure 7D:
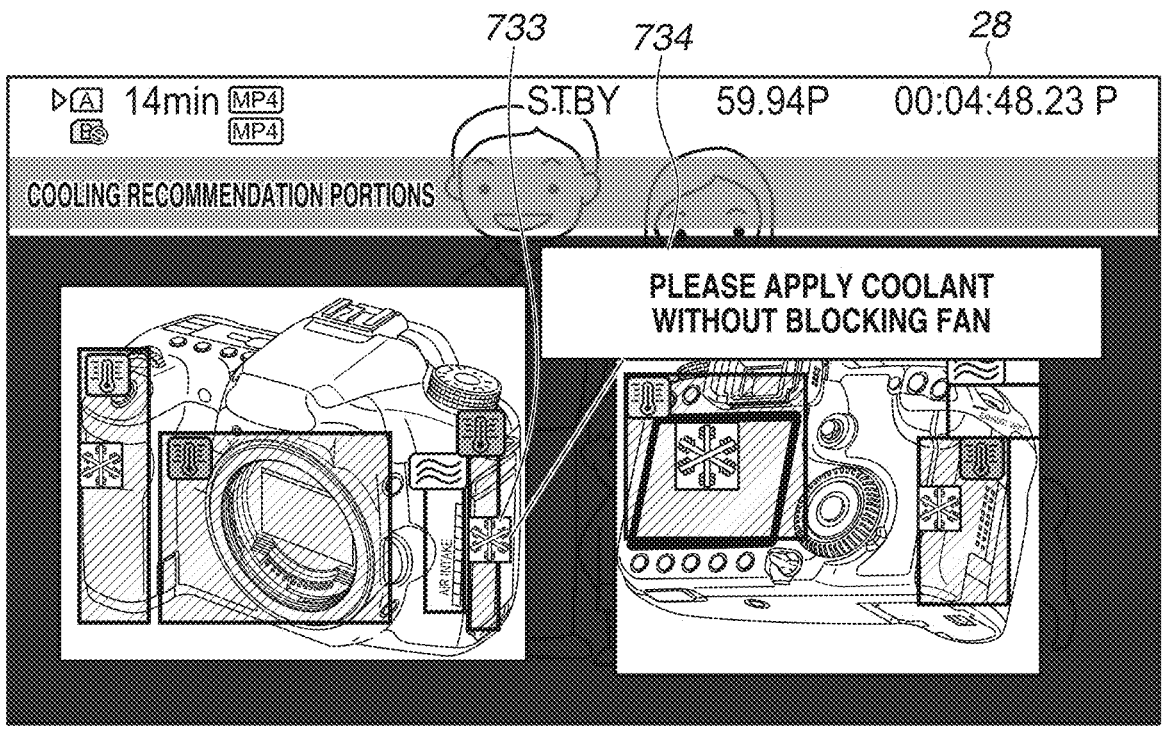
Figure 8A:
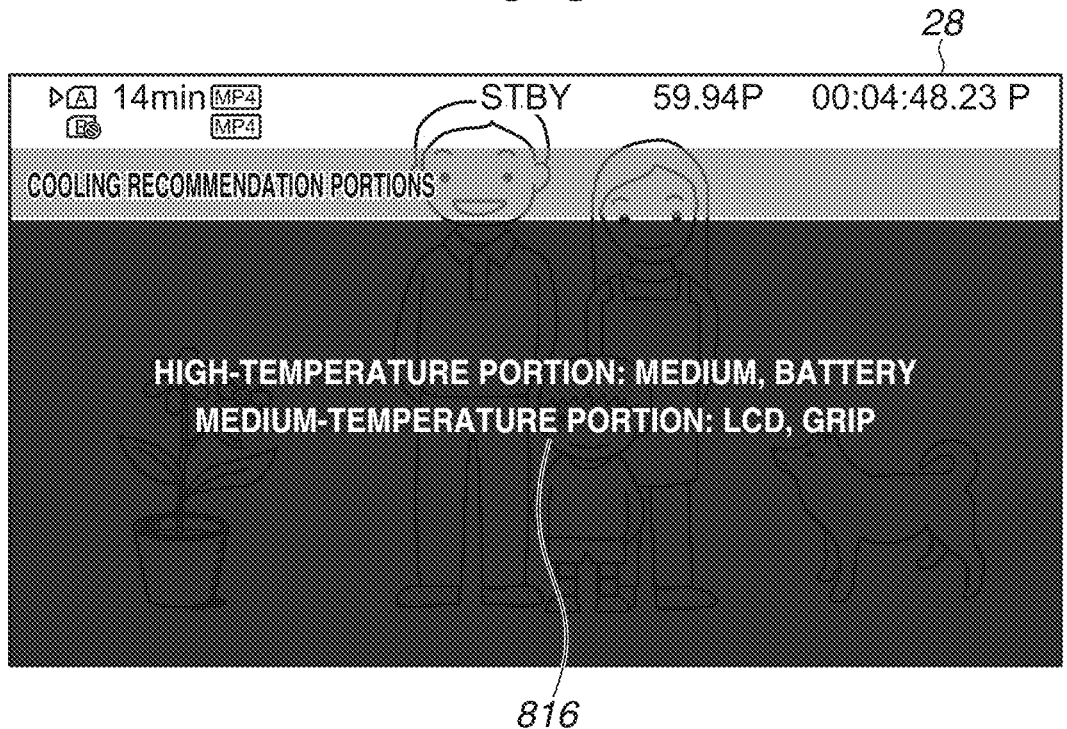
FIGS. 8A and 8B illustrate a display example illustrating cooling recommendation portions of the digital camera.
Figure 8B:
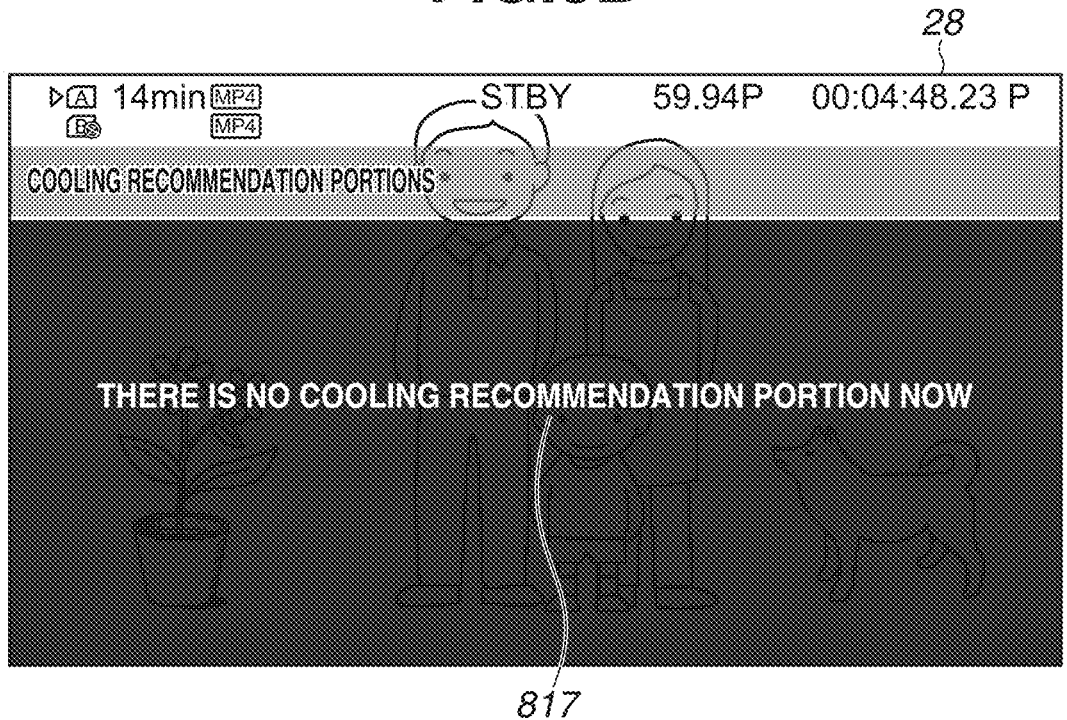

FIGS. 7A to 7D and FIGS. 8A and 8B illustrate examples of display performed on the display unit 28 in a case where an instruction is given (the assign button 95 is pressed in the present exemplary embodiment) by the user in the moving image recording standby state or in the state where a moving image is being recorded. These are examples of display performed in S344 in FIG. 3C. FIGS. 7A to 7D illustrate display example 1. FIGS. 8A and 8B illustrate display example 2. FIGS. 9A to 9C illustrate temperature thresholds for temperature sensors 93 and the placement positions of the temperature sensors 93.

Based on the temperatures of a plurality of portions acquired from the temperature sensors 93, the user is informed of the closest portion to the temperature Kh at which the operation is restricted. The digital camera 100 explicitly indicates which portion of the digital camera 100 should be cooled (a cooling recommendation portion) so that the digital camera 100 can record a moving image for a longer time without restricting the operation.

FIG. 7A illustrates an example where the housing of the digital camera 100 is displayed, thereby informing the user of cooling recommendation portions indicating which portions should be cooled. Images 701 and 702 illustrate external views of the digital camera 100.

Areas 703 to 707 indicate the placement locations of the temperature sensors 93 placed inside the digital camera 100. Areas to be displayed correspond to the number of placed temperature sensors 93. A plurality of temperature sensors may be associated with a single area, or a plurality of areas may be displayed for a single temperature sensor. The temperature of each piece of area display is determined by the system control unit 50 detecting a temperature measured by the temperature sensor 93 every certain period or a temperature measured by the temperature sensor 93 when the assign button 95 is pressed.

Display items 708 to 711 indicate cooling recommendation portions. The display item 708 indicates a portion for cooling the location of the area 703. The display item 709 indicates a portion for cooling the location of the area 705. The display item 710 indicates a portion for cooling the location of the area 706. The display item 711 indicates a portion for cooling the location of the area 707. A cooling recommendation portion only needs to be able to represent at which location in the digital camera 100 the cooling recommendation portion exists. Thus, the cooling recommendation portion is not limited to display as illustrated in FIG. 7A, and may be indicated using representation in which an area indicating a location blinks.

A cooling recommendation portion is displayed in a case where the system control unit 50 compares a temperature measured by a temperature sensor 93 corresponding to a location in the digital camera 100 and a threshold corresponding to the location and the temperature exceeds the threshold. In a case where a plurality of thresholds is present, and if the temperature exceeds any one or more of the plurality of thresholds, the cooling recommendation portion is displayed. At this time, as the threshold for displaying the cooling recommendation portion, the system control unit 50 may use a fixed value, such as a value stored in the system memory 52, or may use a dynamic value, such as a value calculated from the state of the digital camera 100 using a calculation formula.

An area 712 indicates the air intake port 98 of the fan 92, and an area 713 indicates the air exhaust port 99 of the fan 92. Display items 714 and 715 indicate the position of the fan 92. At this time, the display item 714 is displayed so that the user can visually confirm that the display item 714 indicates the air intake port 98, and the display item 715 is displayed so that the user can visually confirm that the display item 715 indicates the air exhaust port 99. The areas 712 and 713 and the display items 714 and 715 indicating the position of the fan 92 are particularly effective in causing the internal temperature Kn of the digital camera 100 to fall. If the fan 92 is being used, the neighborhood of the air intake port 98 of the fan 92 is cooled, whereby cooled air can be sent into the digital camera 100. Consequently, the inside of the digital camera 100 can be cooled more efficiently. On the other hand, even if the neighborhood of the air exhaust port 99 of the fan 92 is cooled, air is merely exhausted from the air exhaust port 99. Thus, the inside of the digital camera 100 cannot be efficiently cooled using the fan 92. That is, the areas 712 and 713 and the display items 714 and 715 are displayed in a superimposed manner on the images 701 and 702 as external views of the digital camera 100, whereby the user can cool the inside of the digital camera 100 more efficiently using the fan 92.

As illustrated in FIG. 7B, the degrees of changes in temperatures measured by the plurality of temperature sensors 93 may be displayed as a bar graph together with the external views of the digital camera 100. Specifically, together with the cooling recommendation portions described with reference to FIG. 7A, the locations (the placement positions of the temperature sensors 93) in the digital camera 100 corresponding to the areas 703 to 707 and the history of the difference between a threshold corresponding to each location and a measured temperature are displayed on the display unit 28.

The images 701 and 702 of the digital camera 100 are displayed by reducing the images 701 and 702 in FIG. 7A. A graph 723 is a bar graph indicating, with respect to each of the placement positions of the temperature sensors 93 placed in the digital camera 100, the difference between a threshold for restricting the operation and a temperature measured by the temperature sensor 93. An X-axis represents the locations in the digital camera 100 corresponding to the temperature sensors 93, and a Y-axis represents the difference between a threshold corresponding to each location and a temperature measured by the temperature sensor 93 corresponding to the location. Since current and past data on the temperature state at each location only needs to be able to be represented, values used in the X-axis and the Y-axis may be changed, or the graph 723 may be indicated using representation other than a bar graph, such as a line graph or the notation of numerical values only.

A display item 724 on the X-axis indicates the locations in the digital camera 100 corresponding to the temperature sensors 93.

Bars 725, 716, and 717 indicate the latest measurement result, a measurement result one result before the latest, and a measurement result two results before the latest, respectively, among temperatures measured by the temperature sensor 93 at each location. Alternatively, only the latest measurement result may be displayed. Any number of past measurement results may be displayed. A measurement result is obtained by the system control unit 50, from the memory 32 with respect to each location, selecting a temperature measured by the temperature sensor 93 every certain period or a temperature measured by the temperature sensor 93 when the assign button 95 is pressed. As the certain period, the system control unit 50 may use a fixed value stored in the system memory 52, or may use a value set by the user. When a measurement result is displayed, then with respect to each location in the digital camera 100, the system control unit 50 may compare a temperature measured by the corresponding temperature sensor 93 and a corresponding threshold stored in the system memory 52 and change the color of the bar graph according to the comparison result.

Display items 718 to 720 on the Y-axis indicate temperature thresholds corresponding to each location in the digital camera 100. The display item 718 on the Y-axis indicates that the temperature is a temperature sufficiently low to use the digital camera 100. The display item 719 on the Y-axis indicates that the temperature comes close to a temperature threshold for restricting the operation. The display item 720 on the Y-axis indicates that the temperature is a temperature at which the digital camera 100 is forcibly shut down (a temperature at which the operation is restricted) to prevent the breakdown of the digital camera 100. Not all the thresholds corresponding to each location need to be displayed. For example, only the display item 720 on the Y-axis indicating the temperature at which the digital camera 100 is forcibly shut down may be displayed, or only an element on the Y-axis indicating a threshold for displaying a cooling recommendation portion determined by the system control unit 50 may be displayed.

A region 721 includes the display item 724, a graph corresponding to each of the temperature sensors 93 in the display item 724, and the periphery of the graph. When the inside of the region 721 displayed on the display unit 28 is touched, the system control unit 50 may perform display such that in the images 701 and 702, the area 707 indicating the location in the digital camera 100 corresponding to the display item 724 on the X-axis blinks. If the inside of the region 721 is touched by the user, the location of the display item 724 on the X-axis corresponding to the region 721 is determined, and the area in the images 701 and 702 corresponding to the touched element is highlighted.

FIGS. 7C and 7D illustrate examples where a recommended cooling method is displayed in addition to the external views of the digital camera 100 in FIG. 7A.

A message 732 is a message notifying the user of a more efficient cooling method in a case where an area 731 is cooled. A message 734 is a message notifying the user of a more efficient cooling method in a case where an area 733 is cooled. As the messages 732 and 734, a message to be displayed changes according to which of temperatures measured by the temperature sensors 93*a* to 93*d* exceeds a threshold. Specifically, as illustrated in FIG. 9A, an area to be displayed on the display unit 28 changes according to which of the temperature sensors 93*a* to 93*d* enters which temperature state (temperature states 1 to 3). Then, a corresponding message as illustrated in FIG. 9B is displayed. The message 732 or 734 may be displayed according to selection of the area display of the area 731 or 733 by a user operation, or may be displayed for only a portion where a temperature acquired by the temperature sensor 93 exceeds a temperature threshold for restricting the operation. If temperatures measured by a plurality of temperature sensors exceed thresholds, a plurality of messages may be displayed. Not only is a message displayed, but also area display may blink or may be highlighted.

The images 701 and 702 described with reference to FIGS. 7A to 7D may be external views of the digital camera 100 or illustration diagrams simulating the digital camera 100. Any number of images 701 or any number of images 702 may be displayed according to the locations or the number of cooling recommendation portions to be displayed. In the present exemplary embodiment, the transmittance is set to such an extent that the user can visually confirm that the LV image is displayed. Then, cooling recommendation portions are displayed in a superimposed manner on the LV image. This means that the cooling recommendation portions are temporarily displayed, and the user can easily confirm the LV image if the user desires. Even if the cooling recommendation portions are displayed, information display of the moving image recording state ("STBY" or "REC") and the moving image recording time is information important regarding the recording of a moving image, and therefore, the user is allowed to visually confirm the information display without an operation of the user. Consequently, the user can visually confirm minimum information regarding the recording of a moving image and also confirm other information regarding cooling recommendation portions.

A plurality of thresholds is determined for a single piece of area display. Alternatively, the number of thresholds may be one. A threshold is determined with respect to each piece of area display. The system control unit 50 acquires a threshold corresponding to area display for comparison and compares the threshold with a temperature measured by the temperature sensor 93 corresponding to the area display. According to the comparison result, the system control unit 50 displays or hides the area display, or changes the color of the area display or the type of an icon attached to the area display. FIG. 9A illustrates examples of the relationships between each piece of area display and thresholds. A column "location in camera" indicates each piece of area display. A column "temperature state 1", a column "temperature state 2", and a column "temperature state 3" each indicate the temperature state of the inside of each piece of area display classified by thresholds for each piece of area display. In FIG. 9A, each piece of area display has two thresholds. Thus, as a result of the comparison between the thresholds and the temperature, each piece of area display has three temperature states. As described above, the temperature sensors 93*a* to 93*d* illustrated in FIGS. 9A and 9B are temperature sensors installed at different locations inside the digital camera 100 and measure the temperatures of locations in the camera 100. As illustrated in FIG. 9A, as in "lens surface" and "grip", when the temperature of a single location in the camera 100 is measured, the temperature can be measured using a plurality of temperature sensors. Then, thresholds can be provided with respect to each of the temperature sensors, and the temperature state can be determined. On the other hand, as in "LCD", "medium", and "battery", the temperature state can also be determined using a single temperature sensor. Based on the relationships between the placement positions of the temperature sensors 93 and the cooling recommendation portions, it is determined whether to make a determination using a single temperature sensor or a plurality of temperature sensors. As in "lens surface" and "grip", the temperature state may be determined using the same temperature sensor even at different locations. Further, as in "medium" and "battery", the temperature state may be determined using the same temperature sensor and the same thresholds even at different locations. In the present exemplary embodiment, "LCD" refers to the display unit 28. That is, the message 732 indicates that it is recommended to cool the display unit 28 by applying a coolant to the display unit 28. Similarly, "LCD" illustrated in FIGS. 9A and 9B also refers to the display unit 28.

As each of the thresholds for each piece of area display, the system control unit 50 may use a fixed value such as a value stored in the system memory 52, or may use a dynamic value such as a value calculated from the state of the digital camera 100. As each of the thresholds for each piece of area display, a threshold when the temperature state 1 illustrated in FIG. 9A transitions to the temperature state 2 illustrated in FIG. 9A and a threshold when the temperature state 2 transitions to the temperature state 1 may be set to different thresholds according to the states before and after the transition. This is because if these thresholds have the same value, the temperature state may change between the temperature states 1 and 2 in a short time, and the temperature state may instantly change. Thus, the user may feel troublesome, or may become confused.

FIG. 8A illustrates an example where the user is informed by text of cooling recommendation portions indicating which portions should be cooled. As described above with reference to FIGS. 7A to 7D, the cooling recommendation portions are the placement positions of the temperature sensors 93.

A message 816 is displayed on the display unit 28 in a case where a temperature measured by any of the temperature sensors 93 exceeds the temperature Kh at which the operation of the digital camera 100 is restricted (described above with reference to FIG. 4). If there is a temperature sensor 93 having measured a temperature exceeding the temperature Kh, the position where the temperature sensor 93 is placed is displayed as a high-temperature portion. If the temperature Kn acquired by the temperature sensor 93 is Kl≤Kn≤Kh, the placement position of the temperature sensor 93 is displayed as a medium-temperature portion. If there is a plurality of thresholds corresponding to each location, then according to a temperature measured at each location and the number of thresholds that the temperature exceeds, the temperature state may be set and displayed with respect to each threshold as illustrated in FIG. 9A.

A message 817 in FIG. 8B is a message displayed on the display unit 28 in a case where the temperature Kn is Kn<Kl in all the temperature sensors 93 placed in the digital camera 100. If Kn<Kl in all the temperature sensors 93, none of the external views of the digital camera 100 as illustrated in FIG. 7A and the message 817 described with reference to FIG. 8B may be displayed.

FIG. 10 illustrates an example of the options for a cooling method for cooling the digital camera 100 that are displayed on the display unit 28 in S350 in FIG. 3B. A dialog box 1001 is displayed in a superimposed manner on the LV image. In the dialog box 1001, selection items 1002 and 1003 and a message 1004 are displayed.

In the message 1004, text "fan rotation is effective in cooling camera" is displayed. Although text as in the message 1004 is displayed in the present exemplary embodiment, some embodiments are not limited to this.

For example, text "there are following two methods for cooling camera" may be displayed.

If the selection item 1002 is selected by the user, the driving of the fan 92 is started. If the selection item 1003 is selected, the digital camera 100 is turned off.

If the remaining amount of the battery included in the power supply unit 30 is smaller than a predetermined amount, the digital camera 100 is turned off, regardless of selection by the user or the temperature difference T2−T1. That is, the remaining amount of the battery is determined before the determination in S349 in FIG. 3B. Then, if the remaining amount of the battery is smaller than the predetermined amount, the processing proceeds to S353. If the fan 92 is driven in the state where the remaining amount of the battery is smaller than the predetermined amount, power is used for the fan 92. As a result, the remaining amount of the battery becomes 0, and a moving image cannot be recorded. Thus, if the remaining amount of the battery is smaller than the predetermined amount, the digital camera 100 is turned off, thereby cooling the digital camera 100. If the digital camera 100 is sufficiently cooled by this process, the digital camera 100 is turned on again and can resume the recording of a moving image. By such control, the recording of a moving image, which is considered as the first priority for the user, can be performed without the user feeling troublesome.

As described above, according to the present exemplary embodiment, an optimal cooling method is determined according to the situation between different cooling methods, such as cooling by rotating a fan and cooling by turning off an electronic device, and is executed, whereby it is possible to cool the electronic device more efficiently.

Figure 11A:
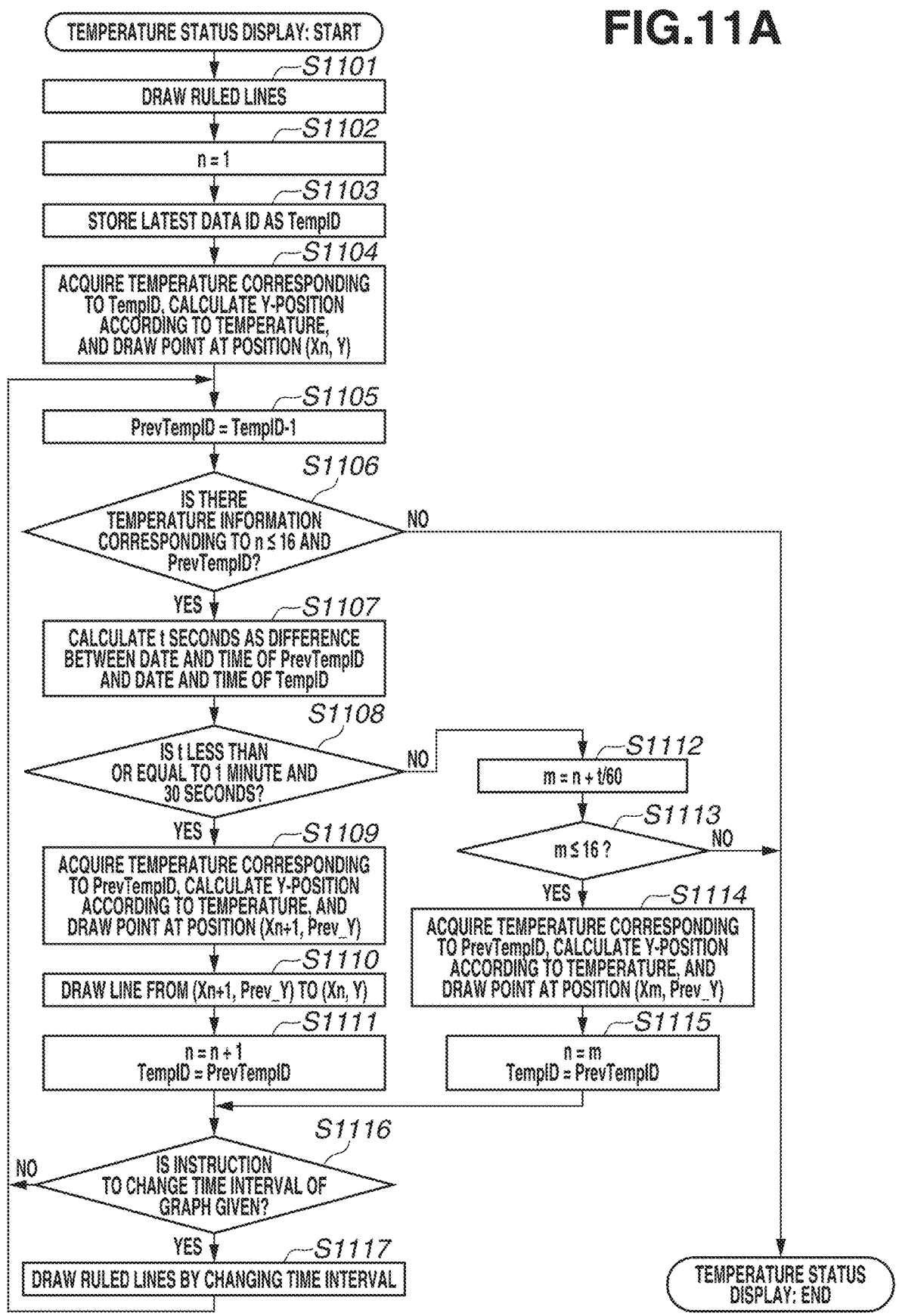
FIGS. 11A and 11B are display control process flowcharts regarding a temperature status display of the digital camera.
Figure 11B:
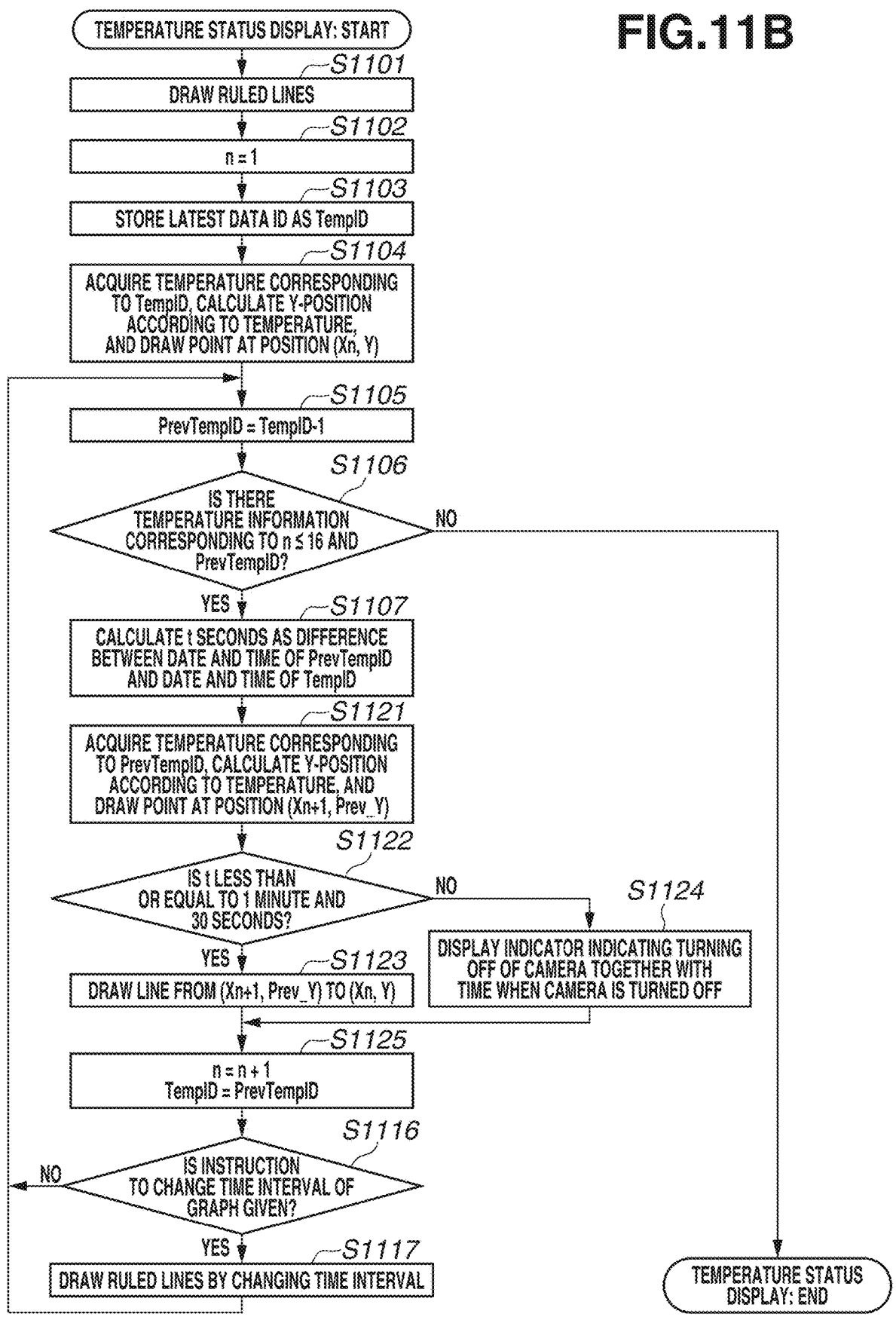

FIGS. 11A and 11B illustrate control flowcharts started if the determination is Yes in S303 FIG. 3A, i.e., the temperature status display is enabled (S304 in FIG. 3A). In the flowcharts illustrated in FIGS. 11A and 11B, display regarding a change in the temperature displayed on the display unit 28 is performed.

Figure 12A:
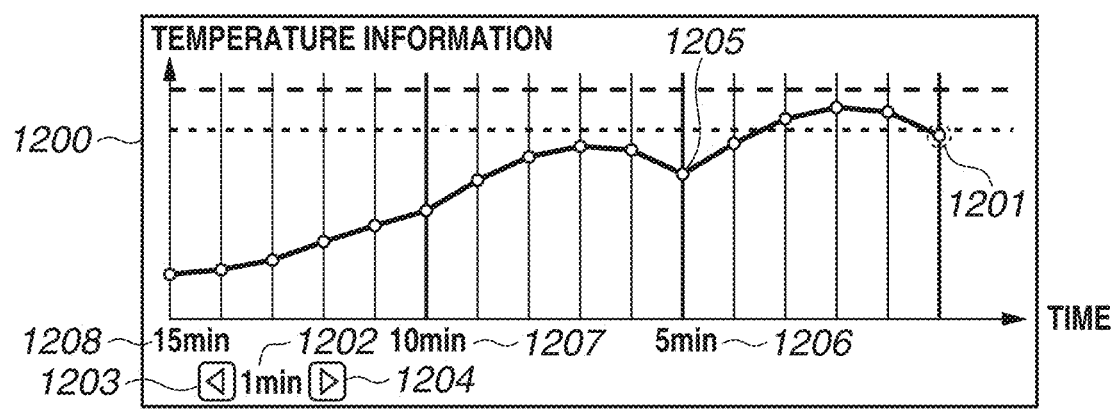
FIGS. 12A to 12D illustrate a display example of a change over time in the temperature and the internal state of the digital camera.
Figure 12B:
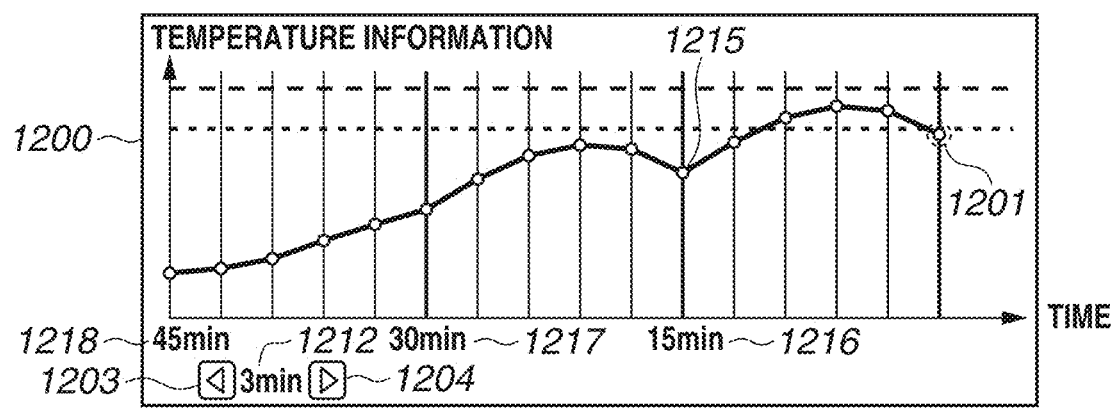
Figures 12C, 12D:
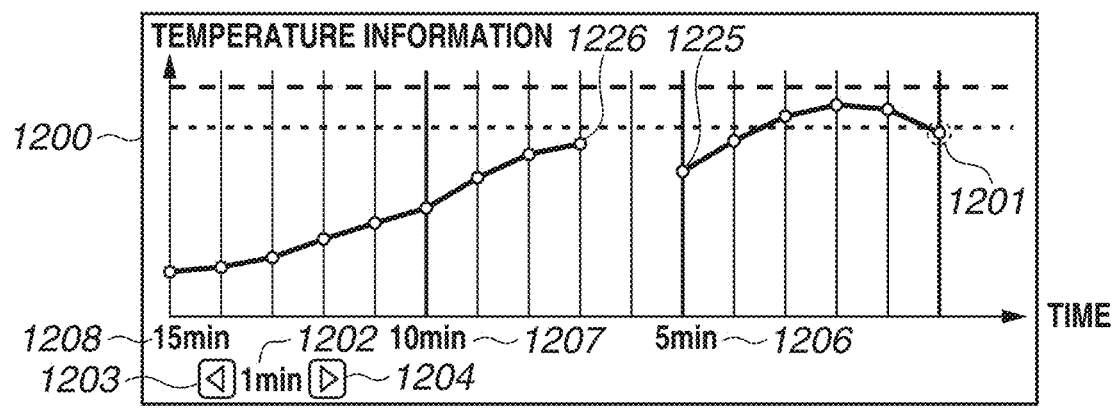

FIGS. 12A to 12C illustrate an example of display performed in the flowchart in FIG. 11A. FIGS. 12A to 12C illustrate an example of display in a case where the time interval of a graph to be drawn can be changed (FIGS. 12A and 12B), and an example of display in a case where the digital camera 100 is off for a certain short time (FIG. 12C). FIG. 12D illustrates data on temperature information stored inside the digital camera 100 at this time.

Figures 13A, 13B:
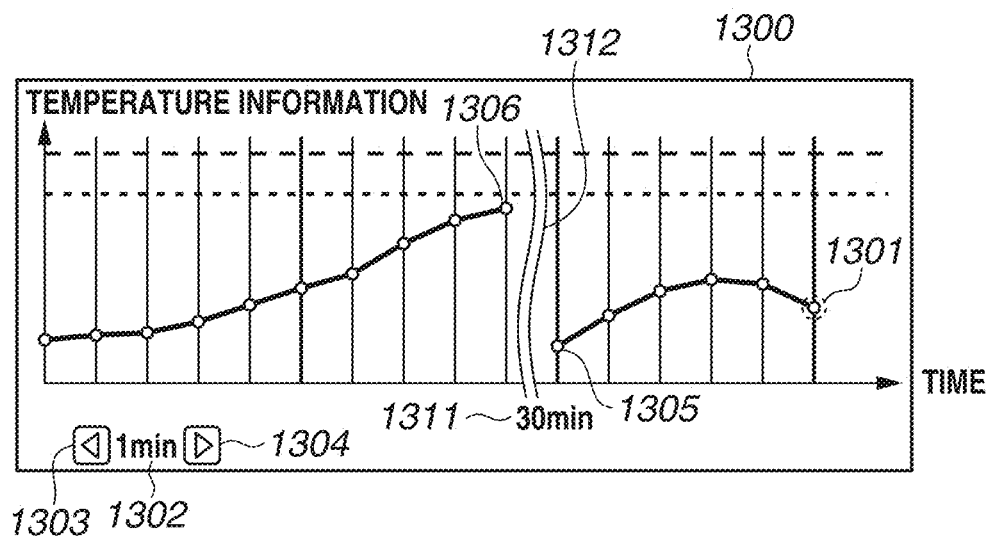
FIGS. 13A and 13B illustrate a display example of a change over time in the temperature and the internal state of the digital camera.

FIG. 13A illustrates an example of display performed in the flowchart in FIG. 11B. FIG. 13B illustrates data on temperature information stored inside the digital camera 100. With reference to FIG. 11B, a description is given of control in a case where the digital camera 100 is off for a certain long time.

First, the control flowchart in FIG. 11A is described. In S1101, the system control unit 50 draws ruled lines of a graph and displays the graph on the display unit 28. At this time, the ruled lines are drawn based on information regarding the time interval of the graph stored in the non-volatile memory 56.

In S1102, similarly to S301, the system control unit 50 sets the variable n indicating the number of times of acquisition of the temperature, to n=1. Then, the system control unit 50 saves the variable n in the system memory 52.

In S1103, the system control unit 50 stores the latest data identification (ID) as TempID in the non-volatile memory 56. "Data ID" refers to ID displayed in an item 1231 in FIG. 12D and assigned to acquired data. For the latest data ID, data indicating "TRUE" is set in an item "latest data?" displayed in an item 1234 in FIG. 12D. If a new piece of data is further added next to data ID "55", the item 1234 of the data ID "55" is set to "FALSE", and the item 1234 of a new piece of data ID "56" is set to "TRUE".

In S1104, the system control unit 50 acquires temperature information corresponding to TempID and calculates the Y-position of the graph according to the temperature information. The system control unit 50 draws a point at a position (Xn, Y) regarding the X-coordinate and the Y-coordinate using the calculated Y-position.

In S1105, the system control unit 50 sets PrevTempID=TempID−1. PrevTempID indicates TempID one piece of ID older than the latest TempID.

In S1106, the system control unit 50 determines whether there is temperature information corresponding to n≤16 and PrevTempID. If the determination is Yes (Yes in S1106), the processing proceeds to S1107. If the determination is No (No in S1106), the control flowchart in FIG. 11A ends. In this operation, the number of points to be plotted when the temperature graph is drawn (the numbers of times and pieces of temperature information used to draw the graph) is 16, and therefore, the condition that n≤16 is used. Thus, the number is not limited to 16, and the specific numerical value of the number can be changed according to points to be plotted on the graph.

In S1107, the system control unit 50 calculates t seconds as the difference between the date and time of PrevTempID and the date and time of TempID and stores the t seconds in the non-volatile memory 56.

In S1108, the system control unit 50 determines whether t calculated in S1107 is less than or equal to 1 minute and 30 seconds. If t is less than or equal to 1 minute and 30 seconds (Yes in S1108), the processing proceeds to S1109. If t is greater than 1 minute and 30 seconds (No in S1108), the processing proceeds to S1112. The determination of the time t in this depends on the acquisition frequency of data regarding a temperature acquired from the temperature sensor 93. In the present exemplary embodiment, the acquisition frequency of the data is set such that the data is acquired about every minute. The details of the acquisition frequency of the data will be described below with reference to FIG. 12D. Although control is performed to acquire the data about every minute, the acquisition timing may exceed 1 minute depending on the processing order of tasks of the temperature sensor 93 or the system control unit 50. Thus, the acquisition timing has a range of 30 seconds. If the data cannot be acquired for a time longer than 1 minute and 30 seconds, it is determined that the digital camera 100 is off. That is, if the digital camera 100 is turned on immediately after being turned off, the next data can be acquired within 1 minute and 30 seconds. Thus, the temperature graph (the temperature status) is not drawn such that the digital camera 100 is turned off.

In S1109, the system control unit 50 acquires temperature information corresponding to PrevTempID and calculates the Y-position according to the temperature information. The system control unit 50 draws a point at a position (Xn+1, Prev_Y) regarding the X-coordinate and the Y-coordinate using the calculated Y-position.

In S1110, the system control unit 50 draws a line by connecting the point at the position (Xn+1, Prev_Y) drawn in S1109 and the point at the position (Xn, Y) drawn in S1104.

In S1111, the system control unit 50 sets n=n+1 and TempID=PrevTempID and stores n and TempID in the non-volatile memory 56.

In S1112, since the determination is No in S1108, the system control unit 50 sets a variable m to m=n+t/60 and stores the variable m in the non-volatile memory 56.

In S1113, the system control unit 50 determines whether m≤16. If m≤16 (Yes in S1113), the processing proceeds to S1114. If not (No in S1113), the control flowchart in FIG. 11A ends.

In S1114, the system control unit 50 acquires temperature information corresponding to PrevTempID and calculates the Y-position according to the temperature information. The system control unit 50 draws a point at a position (Xm, Prev_Y) regarding the X-coordinate and the Y-coordinate using the calculated Y-position.

In S1115, the system control unit 50 sets n=m and TempID=PrevTempID and stores n and TempID in the non-volatile memory 56.

In S1116, the system control unit 50 determines whether an instruction to change the time interval of the graph to be displayed is given. If the instruction is given (Yes in S1116), the processing proceeds to S1117. If the instruction is not given (No in S1116), the processing returns to S1105. Specifically, the instruction to change the time interval refers to an instruction to a display item 1203 or 1204 in FIG. 12A.

In S1117, the system control unit 50 draws ruled lines by changing the time interval.

Next, the control flowchart in FIG. 11B is described. Control operations similar to the control operations in FIG. 11A are designated by the same numbers as the control operations in FIG. 11A, and therefore are not described. With reference to FIG. 11A, a case has been described where the period when the digital camera 100 is turned off is short as illustrated in FIG. 12C. In a case where the time interval is 1 minute (time 1202) as illustrated in FIG. 12C, and if the time when the digital camera 100 is turned off is about 2 minutes, only a part of the graph is not drawn. However, in a case where the time interval is 1 minute, and if the time when the digital camera 100 is turned off is a long time (such as 15 minutes), a large part of the graph may not be drawn, and there may be no point in displaying the temperature graph. Thus, in a case where the digital camera 100 is turned off for a predetermined time or more, the time when the digital camera 100 is turned off is not merely accurately drawn on the graph, but is displayed in an omitted manner.

In S1121, similarly to S1109, the system control unit 50 acquires temperature information corresponding to PrevTempID and calculates the Y-position according to the temperature information. The system control unit 50 draws a point at a position (Xn+1, Prev_Y) regarding the X-coordinate and the Y-coordinate using the calculated Y-position.

In S1122, similarly to S1108, the system control unit 50 determines whether t calculated in S1107 is less than or equal to 1 minute and 30 seconds. If t is less than or equal to 1 minute and 30 seconds (Yes in S1122), the processing proceeds to S1123. If t is greater than 1 minute and 30 seconds (No in S1122), the processing proceeds to S1124.

In S1123, similarly to S1110, the system control unit 50 draws a line by connecting the point at the position (Xn+1, Prev_Y) drawn in S1121 and the point at the position (Xn, Y) drawn in S1104.

In S1124, the system control unit 50 displays on the graph an indicator indicating the turning off of the digital camera 100 together with the time when the digital camera 100 is turned off. FIG. 13A illustrates an example of display at this time.

In S1125, similarly to S1111, the system control unit 50 sets n=n+1 and TempID=PrevTempID and stores n and TempID in the non-volatile memory 56.

FIGS. 12A to 12D illustrate an example of display and a data ID table in a case where the control flowchart in FIG. 11A is performed. FIGS. 13A and 13B illustrate an example of display and a data ID table in a case where the control flowchart in FIG. 11B is performed.

FIGS. 12A to 12C illustrate a graph obtained by plotting and connecting 16 points (acquired 16 times and 16 pieces of temperature information). In a graph 1200, the horizontal axis represents time, and the vertical axis represents temperature information. Ruled lines in the vertical direction are drawn at equal intervals.

FIG. 12A illustrates a temperature graph having a time interval of 1 minute (time 1202) and displayed if the determination is Yes in S1108 in FIG. 11A. A point 1201 indicates the latest temperature information and is displayed in a display form (a double circle in this case) different from those of other points. Since each ruled line indicates 1 minute, it is understood that a point 1205 is a point 5 minutes before the point 1201 indicating the latest temperature information. Since 16 points are acquired, the user can visually confirm a change in the temperature information at a point 1208 indicating the temperature information 15 minutes before the latest temperature information (the point 1201).

Display is performed to indicate that the point 1205 is 5 minutes before the latest point 1201 (time 1206). If an instruction is given to a display item 1203 or 1204 by the user (S1116 in FIG. 11A), the time 1202 is changed, and the time width (interval) indicated by the ruled lines of the graph 1200 is changed. With the change in the time interval, the time 1202 is also changed. If an instruction is given to the display item 1204 in the state illustrated in FIG. 12A, the graph 1200 changes to a temperature graph having a time interval illustrated in FIG. 12B. Even if an instruction is given to the display item 1203 in the state of FIG. 12A, the time interval is not changed.

FIG. 12B illustrates a temperature graph having a time interval of 3 minutes and displayed if the determination is Yes in S1108 in FIG. 11A. If an instruction is given to the display item 1203, the time interval changes to 1 minute (the graph 1200 transitions to FIG. 12A). If an instruction is given to the display item 1204, the time interval changes to 5 minutes. A point 1215 indicates temperature information 15 minutes before the point 1201 indicating the latest temperature information. Since the time interval is 3 minutes, the user can visually confirm a change in the temperature information at a point 1218 indicating the temperature information 45 minutes before the latest temperature information (the point 1201). Since the time interval is greater in FIG. 12B than in FIG. 12A, the graph has a relatively gentle curve. Other items are similar to those in the temperature graph described with reference to FIG. 12A.

FIG. 12C illustrates a temperature graph having a time interval of 1 minute and displayed if the determination is No in S1108 in FIG. 11A. Points 1225 and 1226 are drawn with the line of the graph interrupted (without connecting the line). This indicates that between the points 1225 and 1226, the digital camera 100 is turned off, and time and temperature information are not acquired. FIG. 12D illustrates a data table indicating the data ID, the temperature, and the date and time at this time and acquired to draw the temperature graph. In FIG. 12C, while the digital camera 100 is turned off, the line of the graph is not connected. Some embodiments, however, are not limited to this. Alternatively, for example, the line of the graph may be connected, and only during the state where the digital camera 100 is turned off, the color of the line may be changed, or the line may be drawn as a dotted line. Yet alternatively, only a corresponding portion may be masked, thereby indicating the state where the digital camera 100 is turned off.

In FIG. 12D, a temperature is acquired by the temperature sensor 93 once every minute, and temperature information is stored together with date and time information in the non-volatile memory 56. The data acquired for the temperature graph is stored corresponding to 300 minutes. Even if the time interval is switched, the acquisition frequency of the data to be acquired by the temperature sensor 93 is not changed. That is, even if the time interval is switched, the data is acquired once every minute. There is a difference of about 3 minutes between the date and time of data ID 49 and the date and time of data ID 50 in FIG. 12D. Since the data is acquired by the temperature sensor 93 about every minute, and based on the determination in S1108 in FIG. 11A, it is understood that the situation is such that the data cannot be acquired for 1 minute and 30 seconds or more. Thus, based on these pieces of data, it is assumed that the digital camera 100 is turned off. Then, points are not plotted on the temperature graph. Control of the temperature status display in a case where the data cannot be acquired over a long time will be described below with reference to the flowchart in FIG. 11B and FIGS. 13A and 13B.

By such control, the user can recognize to what extent the temperature Kn of the digital camera 100 will fall due to the state where the digital camera 100 is turned off. Consequently, even if the temperature Kn of the digital camera 100 rises when a next image is captured, the user can predict how long the digital camera 100 should be turned off so that the temperature Kn of the digital camera 100 falls to a temperature at which the user can capture the image for a desired time. Further, it is possible to reduce the loss of an image capturing opportunity because the user cannot capture the image for the desired time due to the rise in the temperature when the next image is captured.

FIG. 13A illustrates a temperature graph having a time interval of 1 minute and displayed if the determination is No in S1106 in FIG. 11B. A point 1301 indicates the latest temperature information. A point 1305 indicates a point about 5 minutes before the latest temperature information. A point 1306 indicates a point about 30 minutes before the point 1305. The points 1305 and 1306 are drawn with the line of the graph interrupted (without connecting the line), and omitted display 1312 and time 1311 are drawn. This indicates that between the points 1305 and 1306, the digital camera 100 is turned off, and time and temperature information are not acquired. FIG. 13B illustrates a data table indicating the data ID, the temperature, and the date and time at this time and acquired to draw the temperature graph.

In FIG. 13B, similarly to the data table illustrated in FIG. 12D, a temperature is acquired by the temperature sensor 93 once every minute, and temperature information is stored together with date and time information in the non-volatile memory 56.

There is a difference of about 30 minutes between the date and time of data ID 49 and the date and time of data ID 50 in FIG. 13B. Since the data is acquired by the temperature sensor 93 about every minute, and based on the determination in S1122 in FIG. 11B, it is understood that the situation is such that the data cannot be acquired for 1 minute and 30 seconds or more. Thus, based on these pieces of data, it is assumed that the digital camera 100 is turned off. Then, points are not plotted on the temperature graph. However, at this time, if points are not merely connected together during the state where the digital camera 100 is turned off as described with reference to FIG. 11A and FIGS. 12A to 12D, this leads to the state where no points are plotted on a graph 1300 at all. Thus, it is highly likely that the user becomes confused. It is sufficiently possible that the digital camera 100 is turned off for about 30 minutes. Thus, if the data is not plotted on the graph each time, this is not user-friendly. Thus, if the difference in time t between a plurality of pieces of data regarding temperatures stored in the non-volatile memory 56 exceeds 1 minute and 30 seconds (No in S1122 in FIG. 11B), points are not connected together by the line, and omitted display is further performed. Although display as illustrated in the omitted display 1312 is performed in FIG. 13A, the present disclosure is not limited to this. At this time, it is also indicated how long the digital camera 100 is turned off (the time 1311). By such control, the user can recognize how long the digital camera 100 should be turned off so that the temperature Kn of the digital camera 100 falls and to what extent the temperature Kn of the digital camera 100 will fall. Consequently, even if the temperature Kn of the digital camera 100 rises when a next image is captured, the user can predict how long the digital camera 100 should be turned off so that the temperature Kn of the digital camera 100 falls to a temperature at which the user can capture the image for a desired time. Further, it is possible to reduce the loss of an image capturing opportunity because the user cannot capture the image for the desired time due to the rise in the temperature when the next image is captured.

In the present exemplary embodiment, the time interval can be changed to any of 1 minute, 3 minutes, 5 minutes, and 10 minutes. In the present exemplary embodiment, as described above, the time interval of the temperature graph that can be changed by the user is determined in advance. Alternatively, the user may be allowed to optionally and freely set the time interval.

In the above description, points are not connected together by the line in the graph in the state where the digital camera 100 is turned off. The present disclosure, however, is not limited to this. For example, even in a still image mode, where it is not necessary to care about the internal temperature because the temperature of the digital camera 100 is less likely to rise, the temperature status display may be controlled similarly to the state where the digital camera 100 is turned off.

The above various types of control performed by the system control unit 50 in the description may be performed by a single piece of hardware, or the processing of the above various types of control may be shared by a plurality of pieces of hardware (e.g., a plurality of processors or circuits), thereby controlling the entirety of the apparatus.

While the present disclosure has described suitable exemplary embodiments in detail, some embodiments are not limited to these specific exemplary embodiments. Some embodiments also includes various forms without departing from the spirit and scope of the disclosure. Further, the above exemplary embodiments merely illustrate exemplary embodiments, and can also be appropriately combined together.

In the above exemplary embodiments, as an example, a case has been described where the present disclosure is applied to a digital camera. The present disclosure, however, is not limited to this example, and is applicable to any electronic device capable of acquiring the temperature of the device. That is, the present disclosure is applicable to a personal computer, a personal digital assistant (PDA), a mobile phone terminal, a mobile image viewer, a printer apparatus including a display, a digital photo frame, a music player, a game apparatus, or an electronic book reader.

The present disclosure is applicable not only to an electronic device main body but also to a control apparatus that communicates with an electronic device (including a digital camera and a network camera) through wired or wireless communication and remotely controls the electronic device. Examples of the apparatus that remotely controls the electronic device include apparatuses such as a smartphone, a tablet PC, and a desktop PC. Based on operations performed in the control apparatus or processes performed in the control apparatus, the control apparatus notifies the electronic device of commands to perform various operations and make various settings and thereby can remotely control the electronic device. The control apparatus may be able to receive a live view image captured by the electronic device through wired or wireless communication and display the live view image.

OTHER EXEMPLARY EMBODIMENTS

Some embodiments can be achieved also by performing the following process. This is the process of supplying software (a program) for achieving the functions of the above exemplary embodiments to a system or an apparatus via a network or various storage media, and of causing a computer (or a central processing unit (CPU) or a microprocessor unit (MPU)) of the system or the apparatus to read and execute a program code. In this case, the program and a storage medium that stores the program constitute the embodiment.

According to the present disclosure, a user can more easily recognize a change in the internal state of a device and a change in the temperature of the device due to the change in the internal state.

OTHER EMBODIMENTS

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Applications No. 2021-053820, which was filed on Mar. 26, 2021, and No. 2021-053821, which was filed on Mar. 26, 2021, both of which are hereby incorporated by reference herein in their entireties.

What is claimed is:

1. An imaging apparatus comprising:
a display; and
at least one memory and at least one processor configured to:
acquire temperatures; and
perform control to display a temperature change on the display according to the temperatures, wherein the display of the temperature change simultaneously displays information about a plurality of the temperatures including information about a latest temperature of the temperatures and information about past temperatures of the temperatures acquired before the latest temperature;
wherein the temperature change is displayed as a graph having a time axis and a temperature axis;
wherein the graph includes a first temperature threshold and a second temperature threshold;
wherein the first temperature threshold is a value concerning a temperature at which a recording of a moving image is stopped;
wherein the second temperature threshold is a temperature at which the recording of the moving image may be possible for only a short period of time; and
wherein the at least one memory and the at least one processor are configured to perform control to display the first temperature threshold using a line and display the second temperature threshold smaller than the first temperature threshold using a band having a predetermined temperature range in the graph.

2. The imaging apparatus according to claim 1, wherein the at least one memory and the at least one processor are configured to perform the control to display the temperature change according to the temperatures as a line graph or a bar graph.

3. The imaging apparatus according to claim 1, wherein the at least one memory and the at least one processor are configured to:
  detect a state of the imaging apparatus; and
  perform control to display a state change indicating a change of the state of the imaging apparatus together with the temperature change as at least one of a bar graph, an icon, and a dialog box.

4. The imaging apparatus according to claim 3, wherein the state of the imaging apparatus is at least one of a recording state, a recording standby state, a cooling state, a communication state, an external connection state, a power saving state, a recording medium state, a driving state of an image capturing unit, a power supply state, and a surrounding environment state.

5. The imaging apparatus according to claim 3, wherein in a case where the icon is selected by a user, the at least one memory and the at least one processor are configured to perform control to display detailed information regarding the state of the imaging apparatus indicated by the icon in a pop-up manner on the display.

6. The imaging apparatus according to claim 3, wherein in a case where a user operation is performed on the dialog box, the at least one memory and the at least one processor are configured to perform control to display a setting item that is another candidate that can be set for the state of the imaging apparatus, and in a case where the setting item is selected by the user, change the state of the imaging apparatus to the selected setting item.

7. The imaging apparatus according to claim 1, further comprising an image sensor,
wherein in a case where the latest temperature of the imaging apparatus exceeds the first temperature threshold when the imaging apparatus records a moving image, the at least one memory and the at least one processor are configured to stop the recording of the moving image.

8. The imaging apparatus according to claim 7, wherein in a case where the latest temperature of the imaging apparatus exceeds the second temperature threshold lower than the first threshold, the at least one memory and the at least one processor are configured to perform control to display predetermined information on the display.

9. The imaging apparatus according to claim 1, wherein the at least one memory and the at least one processor are configured to perform control to display information about the plurality of the temperatures at a predetermined time interval on the display.

10. The imaging apparatus according to claim 1, wherein the at least one memory and the at least one processor are configured to perform control to display the temperatures at a predetermined time interval in the graph.

11. The imaging apparatus according to claim 10, wherein the at least one memory and the at least one processor are configured to:
  set a time interval by a user operation; and
  performs control to display the temperatures at the time interval in the graph.

12. The imaging apparatus according to claim 1, wherein the at least one memory and the at least one processor are configured to:
  record an image acquired by imaging in a recording medium,
  wherein the temperatures are temperatures of the recording medium.

13. The imaging apparatus according to claim 1, wherein the temperatures are temperatures of a battery.

14. A control method for controlling an imaging apparatus, the control method comprising:
  acquiring temperatures; and
  performing control to display a temperature change on a display according to the temperatures,
  wherein control is performed to display the temperature change by simultaneously displaying information about a plurality of the temperatures including information about a latest acquired temperature of the temperatures and information about past temperatures of the temperatures acquired before the latest temperature,
  wherein the temperature change is displayed as a graph having a time axis and a temperature axis,
  wherein the graph includes a first temperature threshold and a second temperature threshold,
  wherein the first temperature threshold is a value concerning a temperature at which a recording of a moving image is stopped,
  wherein the second temperature threshold is a temperature at which the recording of the moving image may be possible for only a short period of time,
  wherein the first temperature threshold is displayed using a line, and
  wherein the second temperature threshold is smaller than the first temperature threshold and is displayed using a band having a predetermined temperature range in the graph.

15. A non-transitory computer readable storage medium that stores computer-executable instructions, wherein the computer-executable instructions cause a computer to execute:
  acquiring temperatures of an imaging apparatus; and
  performing control to display a temperature change on a display according to the temperatures,
  wherein control is performed to display the temperature change by simultaneously displaying information about a plurality of the temperatures including information about a latest acquired temperature of the temperatures and information about past temperatures of the temperatures acquired before the latest temperature, wherein the temperature change is displayed as a graph having a time axis and a temperature axis, wherein the graph includes a first temperature threshold and a second temperature threshold, wherein the first temperature threshold is a value concerning a temperature at which a recording of a moving image is stopped, wherein the second temperature threshold is a temperature at which the recording of the moving image may be possible for only a short period of time, wherein the first temperature threshold is displayed using a line, and wherein the second temperature threshold is smaller than the first temperature threshold and is displayed using a band having a predetermined temperature range in the graph.

* * * * *